United States Patent
Huang et al.

(10) Patent No.: US 12,526,903 B2
(45) Date of Patent: Jan. 13, 2026

(54) LIGHT-EMITTING DEVICE CONTROL METHOD, APPARATUS, ELECTRONIC DEVICE, AND STORAGE MEDIUM

(71) Applicant: Shenzhen Intellirocks Tech. Co., Ltd., Shenzhen (CN)

(72) Inventors: Jiaming Huang, Shenzhen (CN); Wenlong Wu, Shenzhen (CN)

(73) Assignee: Shenzhen Intellirocks Tech. Co., Ltd., Shenzhen (CN)

( * ) Notice: Subject to any disclaimer, the term of this patent is extended or adjusted under 35 U.S.C. 154(b) by 164 days.

(21) Appl. No.: 18/559,192

(22) PCT Filed: Aug. 24, 2021

(86) PCT No.: PCT/CN2021/114182
§ 371 (c)(1),
(2) Date: Nov. 6, 2023

(87) PCT Pub. No.: WO2023/015607
PCT Pub. Date: Feb. 16, 2023

(65) Prior Publication Data
US 2024/0268012 A1  Aug. 8, 2024

(30) Foreign Application Priority Data
Aug. 11, 2021 (CN) .......................... 202110921099.9

(51) Int. Cl.
*G06F 3/0481* (2022.01)
*G06F 3/04847* (2022.01)
*H05B 47/175* (2020.01)

(52) U.S. Cl.
CPC ......... *H05B 47/196* (2024.01); *G06F 3/0481* (2013.01); *G06F 3/04847* (2013.01)

(58) Field of Classification Search
CPC .................. H05B 47/196; G06F 3/0481; G06F 3/04847
See application file for complete search history.

(56) References Cited

U.S. PATENT DOCUMENTS 10,440,794 B2 * 10/2019 Alexander .......... G06F 3/04883
2021/0165154 A1 * 6/2021 Rodinger ............. G02B 6/0015

FOREIGN PATENT DOCUMENTS

CN       111381794 A       7/2020
CN       112669828 A       4/2021

OTHER PUBLICATIONS

"Nanoleaf Feature: Layout Assistant | Nanoleaf", May 17, 2021 https://www.youtube.com/watch?v=D8ysDe-n8hM "nanoleaf.pdf" 1 pg. (Year: 2021).*

* cited by examiner

Primary Examiner — Haoshian Shih
(74) Attorney, Agent, or Firm — Wenye Tan

(57) ABSTRACT

This disclosure discloses a light-emitting device control method. A terminal device obtains and displays a target splicing shape on a control interface; records the configuration parameters of the virtual control in response to a configuring operation of a selected virtual control in the target splicing shape; determines a sorting value of the virtual control in the target splicing shape; obtains the control information according to the configuration parameters and sorting value, and sends the control information to the controller. The controller receives the control information sent by the terminal device, and controls the lighting of the target light-emitting module according to the control information. The control method provided by this disclosure can avoid the operation of establishing communication connections between all light-emitting modules and the terminal device, improving control efficiency and reducing production costs at the same time.

18 Claims, 10 Drawing Sheets

| The controller receives the control information sent by the terminal device. The control information is generated by the terminal device based on the received configuring operation of the selected virtual control. The control information includes the configuration parameters of the selected virtual control and the sorting value of the selected virtual control in the target stitching shape | S510 |

| The controller performs lighting control on the target light-emitting module according to the control information, and the target light-emitting module is the light-emitting module corresponding to the sorting value in the physical shape | S520 |

FIG. 9

LIGHT-EMITTING DEVICE CONTROL METHOD, APPARATUS, ELECTRONIC DEVICE, AND STORAGE MEDIUM

CROSS-REFERENCE TO RELATED APPLICATIONS

This application is a national stage entry of PCT Patent Application No. PCT/CN2021/114182, filed on Aug. 24, 2021, which claims the priority of Chinese Patent Application No. 202110921099.9, filed on Aug. 11, 2021, titled "LIGHT-EMITTING DEVICE CONTROL METHOD, APPARATUS, ELECTRONIC DEVICE, AND STORAGE MEDIUM," the entire content of all of which is incorporated herein by reference.

FIELD OF THE DISCLOSURE

The present disclosure relates to the field of lighting control technology and, more specifically, to a light-emitting device control method, apparatus, electronic device, lighting-effect control system, and storage medium.

BACKGROUND

In addition to meeting the daily lighting needs for families, lighting can also use different types of smart lamps to create lighting atmospheres suitable for different life scenarios. Among them, splicable lamps, as a type of smart lighting equipment, can form various patterns and shapes by splicing multiple smart light blocks like a puzzle, bringing users a new lighting experience.

Existing splicable electric lamps mainly control the lighting effect through a terminal device. Terminal devices, such as remote controls, are connected to the splicing lamps and can directly control the light-emitting devices according to the user's lighting effect requirements. However, the inventor realized that such control process often is not intuitive and the interactive experience is often poor.

SUMMARY OF THE DISCLOSURE

Embodiments of the present disclosure provide a light-emitting device control method, apparatus, electronic device, lighting-effect control system, and storage medium.

In a first aspect, some embodiments of the present disclosure provide a method for controlling a light-emitting device, which is applied to a terminal device configured with a control interface. The terminal device is communicatively connected to the light-emitting device. The light-emitting device includes a controller and multiple light-emitting modules. The control method includes: obtaining and displaying a target splicing shape on the control interface, wherein the target splicing shape includes multiple visual virtual controls, and the target splicing shape is used to instruct a user to splice the controller and the plurality of light-emitting modules into a physical shape consistent with the target splicing shape; in response to a configuring operation on a selected virtual control in the target splicing shape, recording configuration parameters of the selected virtual control; determining a sorting value of the selected virtual control in the target splicing shape; obtaining control information according to the configuration parameters and the sorting value; and sending the control information to the controller, wherein the control information is used to instruct the controller to perform lighting control on a target light-emitting module, and the target light-emitting module is a light-emitting module corresponding to the sorting value in the physical shape.

In a second aspect, some embodiments of the present disclosure also provide a method for controlling a light-emitting device, which is applied to a light-emitting device. The light-emitting device includes a controller and a plurality of light-emitting modules, the light-emitting device is communicatively connected to a terminal device; the plurality of the light-emitting modules are spliced according to a target splicing shape, the target slicing shape is determined by a splicing shape of virtual controls displayed on the control interface of the terminal device. The control method includes: receiving, by the controller, control information sent by the terminal device, wherein the control information is generated by the terminal device based on a received configuring operation on a selected virtual control, and the control information includes configuration parameters of the selected virtual control and a sorting value of the selected virtual control in the target splicing shape; and performing, by the controller, lighting control on a target light-emitting module according to the control information, the target light-emitting module being a light-emitting module corresponding to the sorting value in the physical shape.

In a third aspect, some embodiments of the present disclosure also provide a method for controlling a light-emitting device, which is applied to a lighting-effect control system. The lighting-effect control system includes a terminal device and a light-emitting device, the light-emitting device includes a controller and a plurality of light-emitting modules, and the terminal device is communicatively connected to the light-emitting device. The control method includes: obtaining and displaying, by the terminal device, a target splicing shape on the control interface, wherein the target splicing shape includes multiple visual virtual controls, and the target splicing shape is used to instruct a user to splice the controller and the plurality of light-emitting modules into a physical shape consistent with the target splicing shape; in response to a configuring operation on a selected virtual control in the target splicing shape, recording, by the terminal device, configuration parameters of the selected virtual control; determining, by the terminal device, a sorting value of the selected virtual control in the target splicing shape, and obtaining control information according to the configuration parameters and the sorting value; and sending, by the terminal device, the control information to the controller; receiving, by the controller, the control information, and performing lighting control on a target light-emitting module, the target light-emitting module being a light-emitting module corresponding to the sorting value in the physical shape.

In a fourth aspect, some embodiments of the present disclosure also provide a control apparatus for a light-emitting device, which runs on a terminal device configured with a control interface, wherein the terminal device is communicatively connected to the light-emitting device, and the light-emitting device includes a controller and a plurality of light-emitting modules. The control apparatus includes: a shape acquisition module, configured to obtain and display a target splicing shape on the control interface, wherein the target splicing shape includes multiple visual virtual controls, and the target splicing shape is used to instruct a user to splice the controller and the plurality of light-emitting modules into a physical shape consistent with the target splicing shape; a parameter recording module, configured to, in response to a configuring operation on a selected virtual control in the target splicing shape, record configuration parameters of the selected virtual control; a sorting determination module, configured to determine a sorting value of the selected virtual control in the target splicing shape; a control instruction module, configured to obtain control information according to the configuration parameters and the sorting value; and an instruction sending module, configured to send the control information to the controller, wherein the control information is used to instruct the controller to perform lighting control on a target light-emitting module, and the target light-emitting module is a light-emitting module corresponding to the sorting value in the physical shape.

In a fifth aspect, some embodiments of the present disclosure also provide a control apparatus for a light-emitting device, which runs on the light-emitting device. The light-emitting device includes a controller and at least one light-emitting module. The light-emitting device is communicatively connected to the terminal device. The control apparatus includes: a receiving module, configured to receive control information sent by the terminal device; and a control module, configured to control lighting of the light-emitting module according to the control information.

In a sixth aspect, some embodiments of the present disclosure further provide a lighting-effect control system. The lighting-effect control system includes a terminal device and a light-emitting device, the light-emitting device includes a controller and at least one light-emitting module, and the terminal device is communicatively connected to the light-emitting device. The terminal device is used to obtain and display a target splicing shape on the control interface, wherein the target splicing shape includes multiple visual virtual controls, and the target splicing shape is used to instruct a user to splice the controller and the plurality of light-emitting modules into a physical shape consistent with the target splicing shape. The terminal device is used to, in response to a configuring operation on a selected virtual control in the target splicing shape, record configuration parameters of the selected virtual control. The terminal device is used to determine a sorting value of the selected virtual control in the target splicing shape, and to obtain control information according to the configuration parameters and the sorting value. The controller is used to receive the control information and, based on the control information, perform lighting control on a target light-emitting module, and the target light-emitting module is a light-emitting module corresponding to the sorting value in the physical shape.

In a seventh aspect, some embodiments of the present disclosure further provide an electronic device, including a memory. The memory stores computer program instructions. When the computer program instructions are called by the processor, the above-mentioned light-emitting device control method is executed.

In an eighth aspect, some embodiments of the present disclosure further provide a computer-readable storage medium that stores program code. When the program code is run by a processor, the above-mentioned light-emitting device control method is executed.

According to the light-emitting device control method provided by this disclosure, the terminal device can obtain and display the target splicing shape in the control interface, and then the terminal device can record the configuration parameters of the virtual control in response to the configuring operation of the selected virtual control in the target splicing shape, and determine the sorting value of the virtual control in the target splicing shape. Further, the terminal device can obtain the control information based on the configuration parameters and sorting value, and send the control information to the controller. Further, the controller can receive the control information sent by the terminal device, and perform lighting control on the target light-emitting module according to the control information. Thus, the control process of the light-emitting device can be intuitively displayed on the control interface of the terminal device, which can improve the user's control experience. Further, the terminal device can generate corresponding control information according to the sorting value and configuration parameters of the virtual control in the target splicing shape, and send it to the controller of the light-emitting device. The controller can perform lighting control on the target light-emitting module according to the control information, avoiding the need for each light-emitting module to establish a communication connection with the terminal device, improving control efficiency and, at the same time, reducing the use of micro-controllers by the light-emitting module and reducing production costs.

BRIEF DESCRIPTION OF THE DRAWINGS

In order to more clearly illustrate the technical solutions in the embodiments of the present disclosure, the drawings used in the description of the embodiments will be briefly introduced below. Obviously, the drawings in the following description are only some embodiments of the present disclosure. For those skilled in the art, other drawings can also be obtained based on these drawings without exerting creative efforts.

FIG. 9 shows a schematic flowchart of another light-emitting device control method provided by an embodiment of the present disclosure.

DETAILED DESCRIPTION

Figure 1:
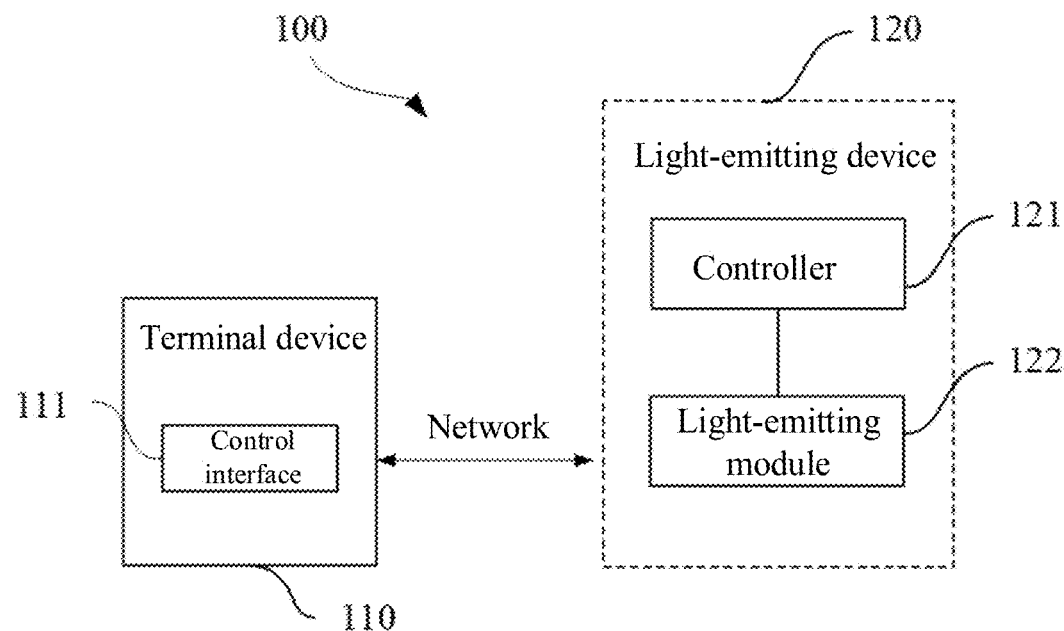
FIG. 1 shows a schematic diagram of a hardware environment of a light-emitting device provided by an embodiment of the present disclosure.

The embodiments of the present disclosure are described in detail below. Examples of the embodiments are shown in the accompanying drawings, and the same or similar reference numerals throughout represent the same or similar elements or elements with the same or similar functions. The embodiments described below with reference to the accompanying drawings are exemplary and are only used to explain the present disclosure and cannot be understood as limiting the present disclosure.

In order to enable those skilled in art to better understand the solutions of the present disclosure, the technical solutions in the embodiments of the present disclosure will be described below together with the accompanying drawings. Obviously, the described embodiments are only some of the embodiments of the present disclosure, but not all of the embodiments. Based on the embodiments in this disclosure, other embodiments obtained by those skilled in the art without creative efforts shall fall within the scope of protection of this disclosure.

Most of the splicable lamp products on the market today rely on a master-slave communication method to complete the control of the splicable lighting blocks. That is, each lighting block establishes a communication connection with a master control device that controls the lighting effect. Specifically, the master control device needs to use the master-slave communication method to determine the connection relationship with each lighting block. For example, a serial number is assigned to each lighting block, and then the connection relationship and serial number are sent to the master control device, and then through the splicing information of the master control device, any one or multiple lighting blocks can be controlled to display the specified color or adjust the brightness.

To this end, the lighting blocks must be equipped with independent control units. That is, each lighting block needs to be equipped with its own Micro Controller Unit (MCU), so that each lighting block can respond to the addressing instructions and control instructions of the main control device. Finally, the serial number of each lighting block is determined through the addressing instructions and, then, combined with the electrical connection relationships among the lighting blocks, a series of lighting effects can be determined. However, this lighting effect control method is prone to errors in the process of identifying the serial numbers and connection relationships of the lighting blocks, resulting in the problem that the splicing pattern of the actual lighting group does not match the pattern displayed by the main control device. In addition, since each lighting block is required to have an independent MCU, it also increases the production cost of the lighting blocks.

In order to solve the above problems, after long-term research, the inventor reconstructed the lighting effect control method on the terminal device based on the hardware improvement of the light-emitting devices. According to the light-emitting device control method provided by the embodiments of the present disclosure, the terminal device can obtain and display the target splicing shape in a control interface. Then, in response to the configuring operation on the selected virtual control in the target splicing shape, the terminal device can record the configuration parameter(s) of the virtual control, and determine the sorting value of the virtual control in the target splicing shape. Then, based on the configuration parameters and sorting value, the terminal device can obtain control information and send the control information to the controller.

Further, the controller can receive control information sent by the terminal device, and perform lighting control on the target light-emitting module according to the control information. Thus, the terminal device can generate corresponding control information according to the sorting value of the virtual control in the target splicing shape, and send it to the controller of the light-emitting device. The light-emitting controller can perform lighting control on the target light-emitting modules according to the control information. Therefore, each light-emitting module does not need to establish a communication connection with the terminal device, reducing the usage of micro-control units by the light-emitting modules and reducing production cost.

The following introduces a hardware environment of the method for controlling the light-emitting devices in this disclosure.

As shown in FIG. 1, in some embodiments, the light-emitting device control method provided by the embodiments of the present disclosure can be applied to a lighting-effect control system 100 shown in FIG. 1. The lighting-effect control system 100 includes a terminal device 110 and a light-emitting device 120. The terminal device 110 can be an electronic device with communication and control capabilities, such as a mobile phone, a tablet computer, or a PC. The terminal device 110 is configured with a control interface 111, and the light-emitting device 120 includes a controller 121 and a light-emitting module 122. The terminal device 110 can be connected to the light-emitting device 120 through a network. The network can be a wireless network such as Wi-Fi, Bluetooth, and ZigBee that can realize mutual communication connection between the terminal device and the light-emitting device, which is not limited here. In one embodiment, the light-emitting device 120 may include a plurality of light-emitting modules 122, and the plurality of light-emitting modules 122 may be electrically connected to the controller 121 (including but not limited to direct connection or indirect connection). The plurality of light-emitting modules 122 may also be electrically connected among themselves, and can emit light according to specified lighting-effect parameters under the control of the controller 121.

Optionally, the light-emitting module 122 may have a polygonal structure, and the plurality of light-emitting modules 122 in the light-emitting device 120 may have polygonal structures of different shapes. For example, some of the light-emitting modules 122 may have a triangular structure, some of the light-emitting modules 122 may have a pentagonal structure, and some of the light-emitting modules 122 may have a hexagonal structure, and so on. Each light-emitting module 122 may include a plurality of light strips, that is, the edge light-emitting units disposed on at least one edge of the polygonal structure, where each edge light-emitting unit has an independent control chip (i.e., integrated circuit chip or IC). The control IC can be used to receive and transmit control information and/or control instructions, and to control the lighting effect of the edge light-emitting unit according to the control information or/and control instructions. In the embodiments of this disclosure, there is no MCU inside the edge light-emitting unit, but a single-thread 256-level grayscale three-channel constant-current LED driver IC chip is used to control the light color of the light-emitting unit. Compared with the price of MCU, the IC chip can significantly reduce production cost. The IC chip can include commonly used WS2811, WS2815, and GS1903 chips, etc. Since the IC chips of the multiple light-emitting units can be cascaded through a serial interface and use one data line to complete the reception, decoding, shaping and forwarding of data signals, the communication process does not require the participation of a control unit, so the light-emitting device control method in this disclosure can avoid identification errors that are easy to occur in the master-slave communication method, thereby effectively improving the control efficiency of the light-emitting device.

Figure 2:
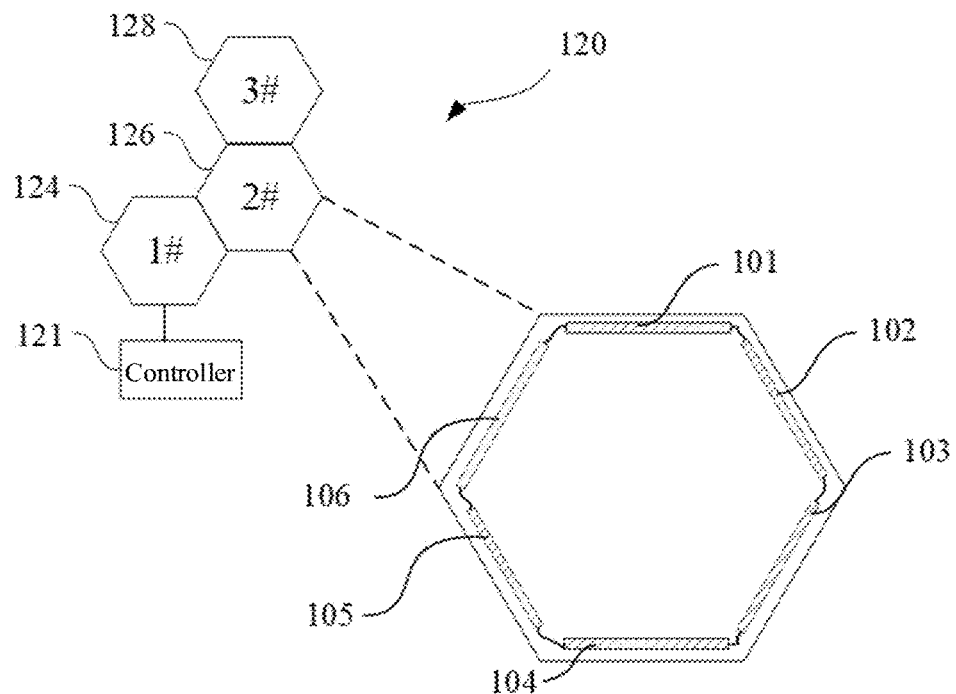
FIG. 2 shows a schematic diagram of a hardware environment of a light-emitting module provided by an embodiment of the present disclosure.

In one implementation, as shown in FIG. 2, the light-emitting device 120 includes a controller 121, a first light-emitting module 124, a second light-emitting module 126, and a third light-emitting module 128. It should be noted that the number and shapes of the light-emitting modules in the light-emitting device 120 can be selected by the user according to different use scenarios. Optionally, the first light-emitting module 124 and the second light-emitting module 126 have a hexagonal structure. Each hexagonal light-emitting module is configured with six light-emitting units, and the six light-emitting units are connected in series to the light-emitting module at the inside edge of the light-emitting module. For example, the second light-emitting module 126 includes a first light-emitting unit 101, a second light-emitting unit 102, a third light-emitting unit 103, a fourth light-emitting unit 104, a fifth light-emitting unit 105, and a sixth light-emitting unit 106 that are connected in series. It can be understood that in other embodiments, the number of edge light-emitting units included in each polygonal light-emitting module does not have to be consistent with the number of its edges. For example, a hexagonal light-emitting module may include three, four, or five edge light-emitting units, and may also include seven, eight, or more edge light-emitting units. The specific number and location of the edge light-emitting units can be set according to actual needs, and this disclosure does not limit.

Optionally, in one embodiment of the present disclosure, the plurality of light-emitting modules 122 in the light-emitting device 120 can be electrically connected through a hardware interface, so that the control instructions or/and control information can be transmitted among the plurality of light-emitting modules 122 through the hardware interface. Specifically, each light-emitting module 122 may include an input port and an output port. The input port may be used to connect with a controller to receive control instructions sent by the controller, or may be used to connected with the output port of an upper-level light-emitting module, so as to receive the control instruction transmitted by the upper-level light-emitting module. The output port can be used to connect with the input port of the lower-level light-emitting module to transmit the control instruction to the lower-level light-emitting module. At this time, the upper-level light-emitting module, the light-emitting module 122, and the lower-level light-emitting module can be regarded as a cascaded or in series connection relationship. Alternatively, a light-emitting module 122 can include an input port and multiple output ports, the light-emitting module 122 can be connected to a controller or an upper-level light-emitting module through the input port to receive control instructions, and can be connected to multiple lower-level light-emitting modules through the multiple output ports to transmit control instructions. At this time, the light-emitting module 122 and the multiple lower-level light-emitting modules can be regarded as a cascaded or in series connection relationship.

Figure 3:
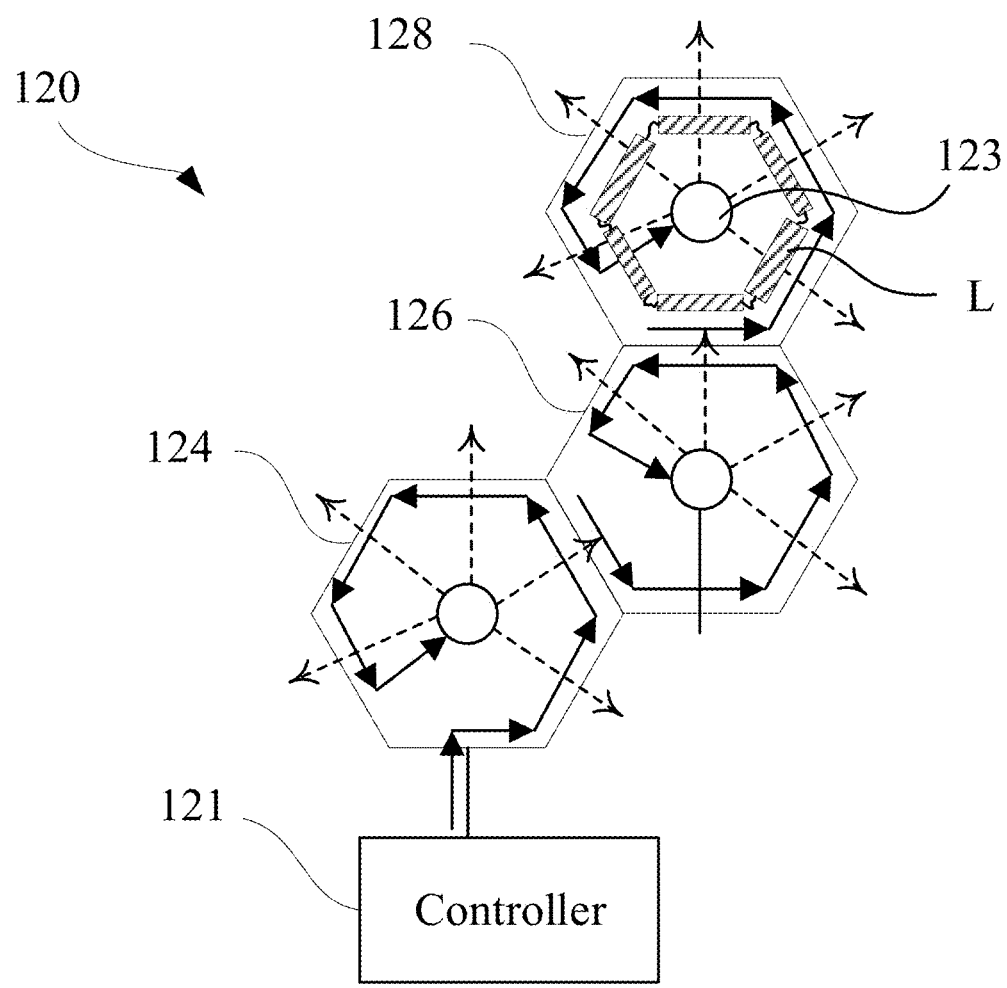
FIG. 3 shows a schematic circuit structure diagram of a light-emitting module provided by an embodiment of the present disclosure.

In some embodiments, as shown in FIG. 3, the light-emitting device 120 is composed of a controller 121 and a plurality of light-emitting modules (for example 3 light-emitting modules, the first light-emitting module 124, the second light-emitting module 126, and the third light-emitting module 128, are shown in FIG. 3, and the actual number of light-emitting modules can be set by the user) spliced together. The solid arrows in FIG. 3 indicate the series connection direction between multiple light-emitting units and the direction of control instruction transmission. Each light-emitting module also includes a line splitter 123. The line splitter 123 includes an input port and five output ports. The input port is used to realize the input of control instructions, and the output port is used to realize the output of control instructions. For example, the dotted arrows indicate the output terminals of the five output ports. It should be noted that each light-emitting module may set the number of input ports and the number of output ports for control instruction transmission according to the number of built-in light-emitting units. Each light-emitting module may be provided with the input terminal of only one input port, and the rest are output terminals of the output ports. Each light-emitting module includes a plurality of edge light-emitting units (only a part is shown in FIG. 3, for example, the third light-emitting module 128 includes six edge light-emitting units L), and each edge light-emitting unit includes several lamp beads and a control IC. The plurality of edge light-emitting units in a light-emitting module are connected in series. Inside the light-emitting device 120, the edge light-emitting units of the first light-emitting module 124, the second light-emitting module 126, and the third light-emitting module 128 may also be connected in series according to the three light-emitting modules connected in series in the splicing structure shown in FIG. 3.

Figure 4:
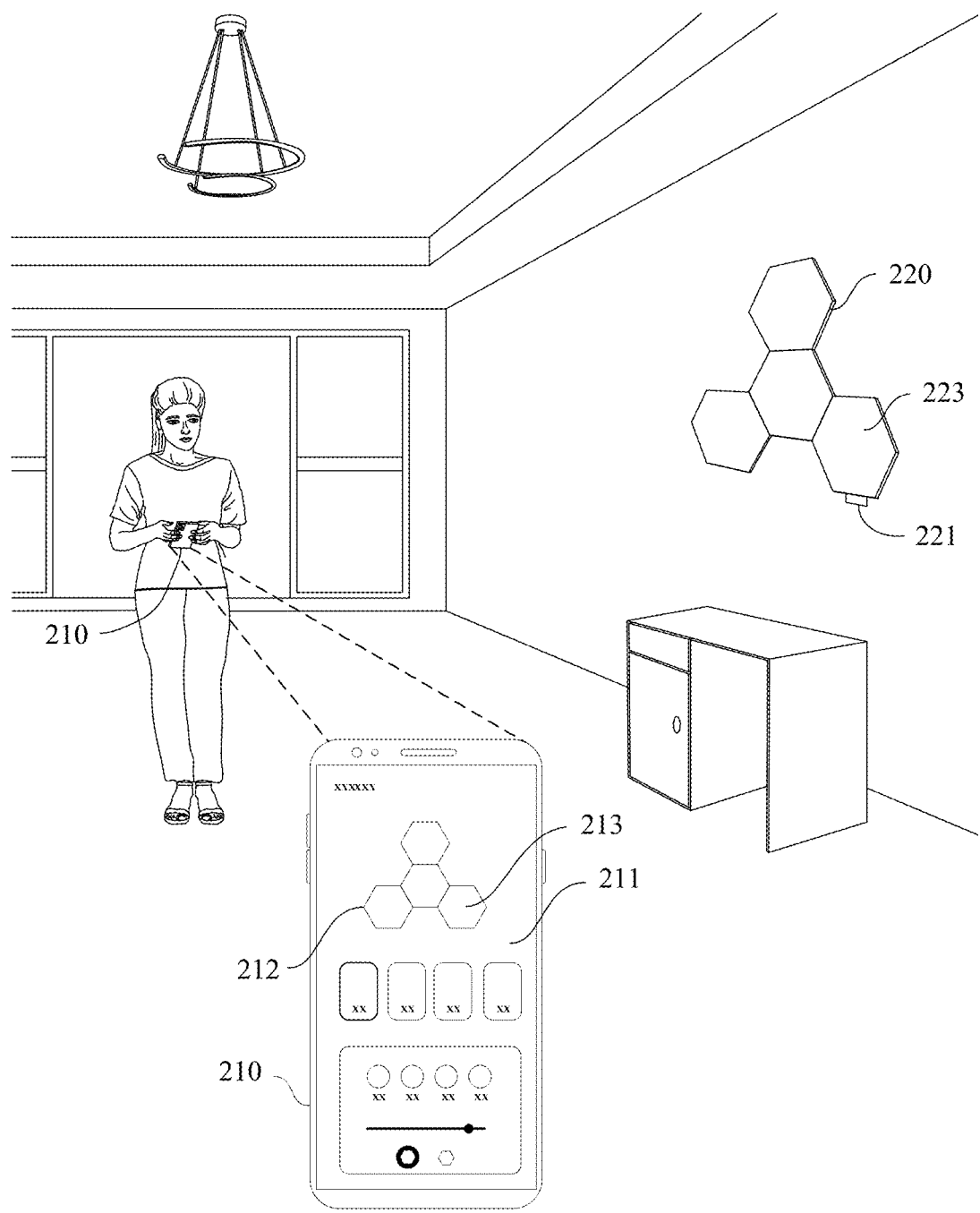
FIG. 4 shows a schematic diagram of an application scenario of a light-emitting device control method provided by an embodiment of the present disclosure.

In some embodiments, referring to FIG. 4, FIG. 4 shows an application scenario of the control method involved in this disclosure. In this scenario, the terminal device 210 can be a mobile phone, and the light-emitting device 220 is composed of four light-emitting modules spliced together according to a certain shape. As an implementation manner, the user can open a control interface on the terminal device 210 for controlling the light-emitting device 220, such as the interface 211 of a designated application software APP, and establish a connection with the light-emitting device 220 through the APP. Then, the user can use the control interface 211 of the APP to control the light-emitting device 220 for different lighting effects according to different requirements. For example, the control interface 211 can display a variety of different splicing shapes of the light-emitting device 220 so that the user can select the target splicing shape, or the user can design a target splicing shape of the light-emitting device 220. Furthermore, the user can set the display effect of the target splicing shape through the control interface. For example, after the user confirms the lighting effect settings, the terminal device 210 can generate a control instruction and send the control instruction to the controller 221 of the light-emitting device 220, and then the controller 221 can control the lighting effects of each light-emitting module.

Various embodiments in the present disclosure will be described in detail below with reference to the accompanying drawings.

Figure 5:
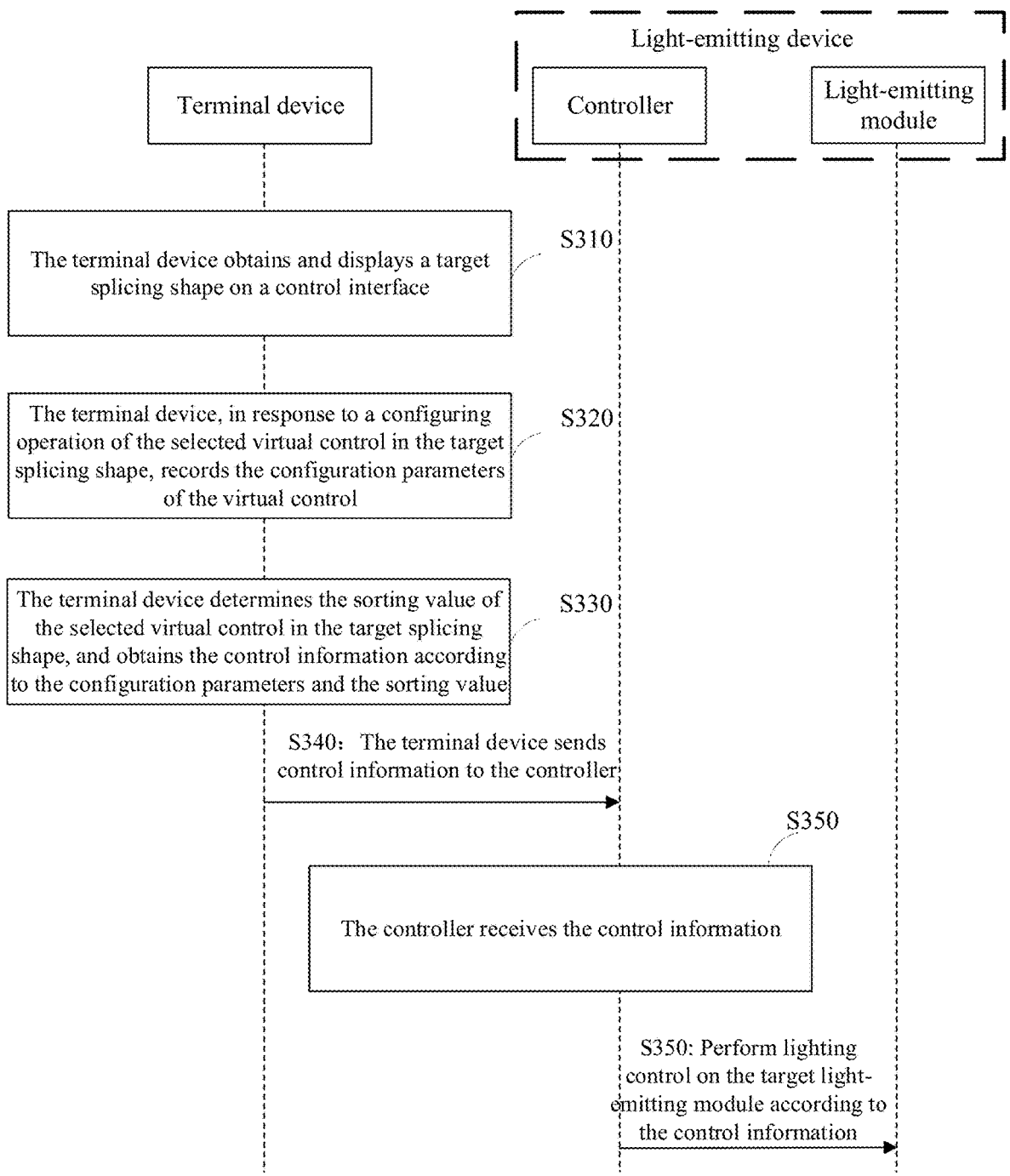
FIG. 5 shows a schematic flowchart of a light-emitting device control method provided by an embodiment of the present disclosure.

Referring to FIG. 5, FIG. 5 shows a light-emitting device control method provided by an embodiment of the present disclosure. The method is applied to a lighting-effect control system. The lighting-effect control system includes a terminal device and a light-emitting device. The light-emitting device includes a controller and a plurality of light-emitting modules, the terminal device is communicatively connected to the light-emitting device, and the control method of the light-emitting device may include the following Step S310 to Step S350.

Step S310: The terminal device obtains and displays a target splicing shape on a control interface. The target splicing shape includes multiple visual virtual controls. The target splicing shape is used to instruct the user to splice the controller and plurality of light-emitting modules into a physical shape consistent with the target splicing shape.

The target splicing shape refers to a virtual shape that is consistent with the shape of the light-emitting device determined by the user on the control interface of the terminal device according to different use scenarios. The target splicing shape may include multiple visual virtual controls. The multiple virtual controls can correspond to the plurality of light-emitting modules in the light-emitting device, or can correspond to the edge light-emitting units on any edge of the light-emitting modules.

As shown in FIG. 4, the virtual shape of the light-emitting device 220 on the control interface 210 is the target splicing shape 212, and the virtual control 213 corresponds to the light-emitting module 223 on the light-emitting device 220. In some embodiments, the terminal device can determine the target splicing shape based on the physical shape of the light-emitting device, or can specify the target splicing shape from a splicing shape library, and then display the target splicing shape through the control interface. The target splicing shape can also be specified by the user on a splicing shape creation interface via adding virtual controls to create a self-defined splicing shape.

As an implementation manner, the terminal device can obtain the target splicing shape according to the user's splicing configuration operation on the control interface. For example, after the user splices the required physical shape of the light-emitting device according to the specific usage scenario, the user can splice a target splicing shape consistent with the physical shape on the control interface of the terminal device. In addition, after the user splices the physical shape of the light-emitting device, the user can use a camera to take a photo of the physical shape. The terminal device can obtain the photo and determine the outline of the internal and external structure of the physical shape in the photo, and then convert the outline into a target splicing shape.

As another implementation, the terminal device can call multiple pre-stored splicing shapes from the splicing shape library and display them on the control interface, so that the user can select a target splicing shape according to the usage scenario and/or usage requirements, so that after the target splicing shape is determined, the user can splice the physical shape of the light-emitting device that has the same shape as the target splicing shape.

As another implementation, the target splicing shape may also include a splicing path, and the splicing path may be set in the form of an arrowed line at the splicing edge of each virtual control, thereby instructing the user to complete splicing the physical shape of the light-emitting module according to the splicing path.

Step S320: The terminal device, in response to a configuring operation of the selected virtual control in the target splicing shape, records the configuration parameters of the virtual control.

In one embodiment of the present disclosure, after displaying the target splicing shape, the terminal device can obtain the configuration or setting parameters of the virtual control selected in the target splicing shape. The configuration parameters refers to the lighting effect parameters for controlling the light-emitting module corresponding to the virtual control set by the user according to the usage requirements of the light-emitting device. The lighting effect parameters may include, but are not limited to, the light color, light brightness, light flash delay, etc., displayed by the light-emitting module/unit, which are not limited here. It should be noted that when setting the virtual control, the virtual control can also synchronously display the lighting effect corresponding to the lighting effect parameter set by the user. For example, after the user selects one or more virtual controls through touch operation and sets the lighting color in the lighting effect parameters to red, the selected virtual control can simultaneously display red to provide the user with an intuitive user experience.

As an implementation manner, after the terminal device displays the target splicing shape, it can record the configuration parameters of the virtual control in response to the user's configuring operation. The configuring operation refers to that, on the control interface, the user issues a human-computer interface interactive operation for controlling the light-emitting module corresponding to the selected virtual control from the target splicing shape to perform lighting effect display. For example, in the lighting effect control window of the control interface, the user issues interactive operations such as selecting virtual controls, inputting instructions, and the like. For the user's operation of selecting virtual controls in the target splicing shape, the user can use touch operation on the control interface to perform select-all, single-select, or multi-select operations on the virtual controls.

For example, the user can select a virtual control on the control interface, and set the color of the light-emitting module corresponding to the virtual control by selecting and sliding the "color" control on the control interface. At this time, the terminal device can obtain the Value attribute value of the "color" slide control (such as RGB values or YUV values), and record the Value attribute value as the color parameter of the corresponding virtual control, that is, the configuration/setting parameter.

As another implementation manner, the configuring operation may refer to, after the user selects a virtual control on the control interface, a selection operation for selecting a lighting effect template in the lighting effect template selection box provided on the control interface. The terminal device can record the configuration or setting parameters of the virtual control based on the user's selection operation. Specifically, after the terminal device obtains the user's selection operation, it can determine the lighting effect template selected by the user based on the selection operation, and use the default lighting effect parameters corresponding to the lighting effect template as the configuration parameters. The lighting effect template is data that has been packaged as control instructions or control information and is pre-stored in the terminal device. The lighting effect parameters of the lighting effect template can include multiple lighting effects (such as marquees and other lighting effects) and the lighting parameters of the light-emitting device corresponding to the lighting effects. Thus, by selecting the pre-stored lighting effect template, the user can quickly obtain the configuration parameters for controlling the light-emitting device. Further, after the user determines the lighting effect template, the terminal device can modify the lighting effect parameters in the lighting effect template in response to the user's configuring operation, so that the lighting effect control can better meet the user's needs.

Step S330: The terminal device determines the sorting value of the selected virtual control in the target splicing shape, and obtains the control information according to the configuration parameters and the sorting value.

In order to effectively reduce the probability of incorrect identification of lighting block serial numbers and connection relationships during the lighting effect control process, the light-emitting device control method provided by this disclosure does not use the master-slave communication method, instead uses a communication method under which the plurality of light-emitting modules of the light-emitting device sequentially transmit control instructions and intercept control instructions in the splicing sequence to realizes the lighting effect control of the light-emitting device by the terminal device. The control instruction refers to an instruction generated based on the control information and used by the terminal device to control the light-emitting device to display consistent lighting effects. The control instruction can be composed of multiple control fields. Each control field corresponds to a light-emitting module and contains operators that the light-emitting module can directly parse and execute. The fixed number of bytes of each control field can be set by the user. The communication method of intercepting control instructions means that based on the series structure of the plurality of light-emitting modules, after receiving the control instruction, each light-emitting module uses its own shaping circuit to intercept the control field in the head of the control instruction for analysis and execution. Further, the current node transmits the control instruction of the remaining segments after interception to the next light-emitting module. When the terminal device generates the control instruction, the operators can be added to the segment corresponding to the sorting value of the selected light-emitting module to be controlled in the series structure, while no content is added to other segments.

For example, assuming that the control field of each light-emitting module corresponds to a length of 3 bytes, and the light-emitting device includes 10 light-emitting modules, the control instruction is 30 bytes in length (assuming that the 10th light-emitting module is also selected for control), the first light-emitting module connected to the controller receives the complete 30-byte length control instruction. During the relay transmission of the control instruction between the light-emitting modules, the first light-emitting module intercepts its own control field corresponding to the sorting value in the serial structure, the control instruction after interception is then transmitted to the second light-emitting module. In this way, the second light-emitting module receives a 27-byte length control instruction. If only the light-emitting modules whose control splicing orders are 3 and 4 are selected, when generating the control instruction, the operators are set in the 3rd and 4th segments of the control instruction, and other segments are not set.

Based on the above description, when the user refers to the target splicing shape to splice the controller and the plurality of light-emitting modules into a physical shape, and the splicing is correct, at the visual level, the target splicing shape and the physical shape can have the same shape in the splicing structure. That is, the virtual control at a specific position in the target splicing shape also has a visually corresponding light-emitting module at the specific position in the physical shape of the light-emitting device. Therefore, the terminal device can determine the sorting value of the selected virtual control in the target splicing shape (the sorting value represents the specific position of the virtual control in the target splicing shape), and generate control information and/or control instruction according to the configuration parameters and the sorting value to achieve lighting control on the light-emitting modules at visually corresponding positions in the physical shape of the light-emitting device, thereby achieving visual consistency in light-emitting control and improving user experience.

Specifically, in the embodiments of the present disclosure, the consistency of the visual perception of light-emitting control means: after the user obtains the physical shape by splicing and controls the light-emitting device of the physical shape according to the target splicing shape, the user sets the virtual control at the target position in the target splicing shape to emit light according to the configured lighting effect parameters. The control information generated in this process can simultaneously control lighting of the light-emitting module corresponding to the virtual control at the target position in the physical shape, so that the light-emitting module can simultaneously emit light according to the lighting effect parameters set in the control information, displaying a consistent lighting effect conforming to the lighting effect parameters. Thus, when the terminal device controls the lighting of the light-emitting device according to the control information, the consistency of the control process in the user's perception is ensured, thereby ensuring that the user has a good interactive experience with the lighting control of the splicable smart lamp.

Further, the target position can be represented by the sorting value of the virtual control in the target splicing shape and, in different application scenarios, the sorting value of the virtual control in the target splicing shape can correspond to the sorting value of the light-emitting module and/or lighting unit under different conditions. In different application scenarios/different conditions of this disclosure, the type of the light-emitting module can be divided into a single-light-source device and a multi-light-source device. The single-light-source device can be understood as a light-emitting module equipped with a light-emitting unit inside, for example, a set of or one light-emitting unit, or the light-emitting module is equipped with multiple light-emitting units but all light-emitting units can only be controlled uniformly (for example, the edge light-emitting units are connected in parallel and used to receive and execute the same segment of the control instruction). The multi-light-source device can be understood that the light-emitting module includes a plurality of cascaded edge light-emitting units, and the plurality of edge light-emitting units can be controlled individually (for example, the plurality of cascaded light-emitting units are configured to receive and execute different control instructions respectively).

In some embodiments, when the light-emitting module is a single-light-source device, each virtual control directly represents each light-emitting module, and multiple virtual controls correspond to a plurality of light-emitting modules one-to-one. The sorting value of the virtual control in the target splicing shape can be the splicing order value of the virtual control. The splicing order value is used to characterize the splicing order of each virtual control when splicing virtual controls to generate the target splicing shape.

In other embodiments, when the light-emitting module is a multi-light-source device, the light-emitting module includes multiple edge light-emitting units, multiple virtual controls and the plurality of light-emitting modules are in one-to-one correspondence, and the virtual controls and their corresponding light-emitting modules have the same shape structure. That is, each virtual control can be configured with virtual light-emitting components corresponding to the light-emitting module. At this time, the sorting value of the virtual control in the target splicing shape can be understood as the sorting number of the virtual light-emitting components in the target splicing shape. For example, the physical structure of the light-emitting module is the light-emitting module 126 in FIG. 2 as an example, the light-emitting module 126 has a hexagonal structure and is configured with multiple edge light-emitting units 101, 102, 103, 104, 105, and 106. The virtual control corresponding to the light-emitting module 126 in the control interface is hexagonal, and the hexagonal structure of the virtual control corresponds to the physical structure of the light-emitting module 126. The virtual control includes virtual light-emitting components arranged on the edges of the hexagonal structure. The setting positions of these virtual light-emitting components on the virtual control are consistent with the setting positions of the multiple edge light-emitting units 101, 102, 103, 104, 105, and 106 on the light-emitting module 126, and the multiple virtual light-emitting components can be controlled individually. At this time, when the target splicing shape is completed by splicing the virtual controls, the sorting value of the selected virtual control is the edge sorting value of the selected edge (such as the virtual light-emitting component) in the selected virtual control in the target splicing shape.

Based on the above explanation, from another perspective, when the user perform lighting control/lighting effect control, the user can select a single or multiple virtual controls (such as the entire hexagon) in the control interface to control the corresponding a single or multiple light-emitting modules. When performing lighting control/lighting effect control, the user can also select a single or multiple virtual lighting components (such as one or more sides of the hexagon) in the control interface to control the corresponding single or multiple edge light-emitting units. Therefore, when the selected virtual control is a virtual control as a whole, its sorting value is the splicing order value of the virtual control; when the selected virtual control is a virtual light-emitting component, its sorting value is the edge sorting value of the selected edge in the selected virtual control (such as the virtual light-emitting component) in the target splicing shape.

As an implementation manner, the terminal device can extract the splicing/sorting order value from the configuration file of the target splicing shape. The configuration file can be used to record the splicing order of each virtual control in the target splicing shape and the position information of each virtual control in the control interface. In the configuration file, position information can be represented by an array type data structure. For example, the target splicing shape contains a first virtual control and a second virtual control, and the configuration file stores position information [a, 1] corresponding to the first virtual control and position information [b, 2] corresponding to the second virtual control, where a and b can be respectively represented as the two-dimensional/three-dimensional coordinate information of the first virtual control and the second virtual control in the control interface, and 1 and 2 are respectively the splicing order values of the first virtual control and the second virtual control. Therefore, the terminal device can display the target splicing shape on the control interface by loading the configuration file.

Specifically, when the terminal device responds to the user's touch operation on the target splicing shape on the control interface, the terminal device can obtain the touch position of the touch operation and, according to the position information of each virtual control recorded in the configuration file, determine the virtual control selected by the user, and finally determine the splicing order value of the selected virtual control by querying the configuration file. For example, when the user uses the mouse to click on the target splicing shape on the control interface, the terminal device can obtain the click position where the cursor clicks, and match the click position with the position information of the virtual controls in the configuration file, thereby determining the splicing order value of the clicked virtual control.

As another implementation manner, the sorting value of the virtual light-emitting component of the virtual control in the target splicing shape can be characterized by the edge number value and the splicing order value. Specifically, as shown in FIG. 2, the splicing order values of the first light-emitting module 124, the second light-emitting module 126, and the third light-emitting module 128 in the light-emitting device 120 are 1 #, 2 #, and 3 #respectively. Taking the incoming edge as a reference, if the first to sixth light-emitting units 101 to 106 of the second light-emitting module 126 are cascaded in sequence, the corresponding edge number values of the first to sixth light-emitting units 101 to 106 are respectively 1 to 6. Then it can be determined that the edge sorting values of the virtual light-emitting components of the virtual controls corresponding to the first to sixth light-emitting units 101 to 106 in the target splicing shape can be expressed as arrays [2, 1], [2, 2], [2,3], [2,4], [2,5] and [2,6], respectively, where in this array, the first digit is the splicing order value, and the second digit is the edge sorting value.

In the embodiments of the present disclosure, after the terminal device determines the sorting/splicing value of each virtual control in the target splicing shape, it can obtain the control information according to the configuration parameters and the sorting value. The control information can be understood as information used to control the light-emitting device, which may include, but not limited to: the light-emitting parameters of the light-emitting modules and/or the edge light-emitting units of the light-emitting device (such as color parameters, brightness parameters, duration parameters, etc., the lighting parameters can be obtained according to the configuration parameters), the sorting values of the light-emitting modules and/or the edge light-emitting units of the light-emitting device. The control information can be used as the basis for the terminal device to control the light-emitting device (for example, the control information is used as the basis for generating control instructions). When the terminal device obtains the control information, it can directly generate control instructions based on the control information. The control instructions can be directly parsed and executed by the light-emitting modules or, after the terminal device obtains the control information, it can transfer the control information to the controller of the light-emitting device, and the controller can generate a control instruction based on the control information, and the control instruction can be directly parsed and executed by the light-emitting modules.

As an implementation manner, the terminal device can package the configuration parameters and sorting values as control information. After the terminal device sends the control information to the light-emitting device, the controller can generate a control instruction according to the configuration parameters and sorting values, and transmit the control instruction to the target light-emitting module to perform lighting control on the target light-emitting module, where the control instruction is parsed and executed by the target light-emitting module.

Considering that the light-emitting device may have limited computing resources, as the number of light-emitting modules continues to increase, the consumption of computing resources required for lighting effect control on the light-emitting modules continue to increase, which in turn leads to a reduction in the operating efficiency of the light-emitting device. To this end, the operation for generating the control instructions can be set to be completed directly by the terminal device.

As another implementation manner, the terminal device can determine the control information according to the configuration parameters and the sorting value, generate a control instruction according to the control information, and send the control instruction as the control information to the light-emitting device. That is, after the terminal device sends the control instruction to the light-emitting device, the control instruction can instruct the controller to forward the control instruction to the target light-emitting module to perform lighting control on the target light-emitting module. The control instruction is parsed and executed by the target light-emitting module. Therefore, the terminal device can generate control instructions directly based on the configuration parameters and sorting values. When the light-emitting device receives the control instruction, it only needs to complete the transmission of the control instruction, saving computing resources and improving operation efficiency.

Step S340: The terminal device sends control information to the controller.

As an implementation manner, the terminal device can directly send the configuration parameters and sorting values as control information to the light-emitting device, so that the light-emitting device generates control instructions based on the control information. As another implementation manner, the terminal device can also obtain control information based on the sorting value and configuration parameters of each light-emitting unit, generate a control instruction based on the control information (the control instruction can be considered to include control information), and then send the control instruction to the light-emitting device. The light-emitting device can directly parse the control instruction to achieve lighting effect control.

Step S350: The controller receives the control information and performs lighting control on the target light-emitting module according to the control information. The target light-emitting module is the light-emitting module corresponding to the sorting value in the physical shape.

As an implementation manner, after the light-emitting device receives the control information, the light-emitting device can instruct the controller to generate a control instruction according to the configuration parameters and sorting value according to the control information, and send the control instruction to the target light-emitting module to perform lighting control. For example, if the control instruction contains the configuration parameters of the virtual control with a sorting value of 2 in the target splicing shape, then the target light-emitting module is a light-emitting module with a sorting value of 2 in the physical shape. After the controller sends the control instruction to the light-emitting device, the target light-emitting module can receive the control instruction and execute it.

As another implementation manner, after the light-emitting device receives the control information, the controller can directly control the lighting of the target light-emitting module according to the control information. Specifically, the controller sends the control instruction to the target light-emitting module, and the target light-emitting module parses and executes the control instruction.

It can be understood that the control instruction can be composed of multiple segments of single-line return-to-zero codes. The multiple segments of single-line return-to-zero codes are arranged in sequence according to the sorting values of the virtual controls, and each segment of single-line return-to-zero codes corresponds to a light-emitting module. When the target light-emitting module receives the control instruction, the target light-emitting module can obtain the single-line return-to-zero codes at the arrangement position corresponding to its own sorting value from the control instruction, and then perform the lighting effect display according to the parsing result of the single-line return-to-zero codes.

For example, the light-emitting device has a first light-emitting module and a second light-emitting module (target light-emitting module). The controller sends the control instruction to the first light-emitting module. After obtaining the control instruction, the first light-emitting module can intercept the first segment of single-line return-to-zero codes in the control instruction, and passes the remaining control instruction after interception to the second light-emitting module. After obtaining the control instruction, the second light-emitting module can intercept the first segment of single-line return-to-zero codes of the control instruction. The first segment of single-line return-to-zero codes is the second segment of single-line return-to-zero codes of the original control instruction. Therefore, the target light-emitting module obtains the corresponding single-line return-to-zero codes. It should be noted that the above steps of the controller sending the control instruction to the target light-emitting module, and the target light-emitting module parsing and executing the control instruction can also be applied to the light-emitting unit. That is, each light-emitting unit can be regarded as a light-emitting module, and vice versa.

According to the light-emitting device control method provided by this disclosure, the terminal device can obtain and display the target splicing shape in the control interface, and then the terminal device can record the configuration parameters of the virtual control in response to the configuring operation of the selected virtual control in the target splicing shape, and determine the sorting value of the virtual control in the target splicing shape. Further, the terminal device can obtain the control information based on the configuration parameters and sorting value, and send the control information to the controller. Further, the controller can receive the control information sent by the terminal device, and perform lighting control on the target light-emitting module according to the control information. Thus, the terminal device can generate corresponding control information according to the sorting value and configuration parameters of the virtual control in the target splicing shape, and send it to the controller of the light-emitting device. The controller can perform lighting control on the target light-emitting module according to the control information, avoiding the need for each light-emitting module to establish a communication connection with the terminal device, improving control efficiency and, at the same time, reducing the use of micro-controllers by the light-emitting module and reducing production costs.

Figure 6:
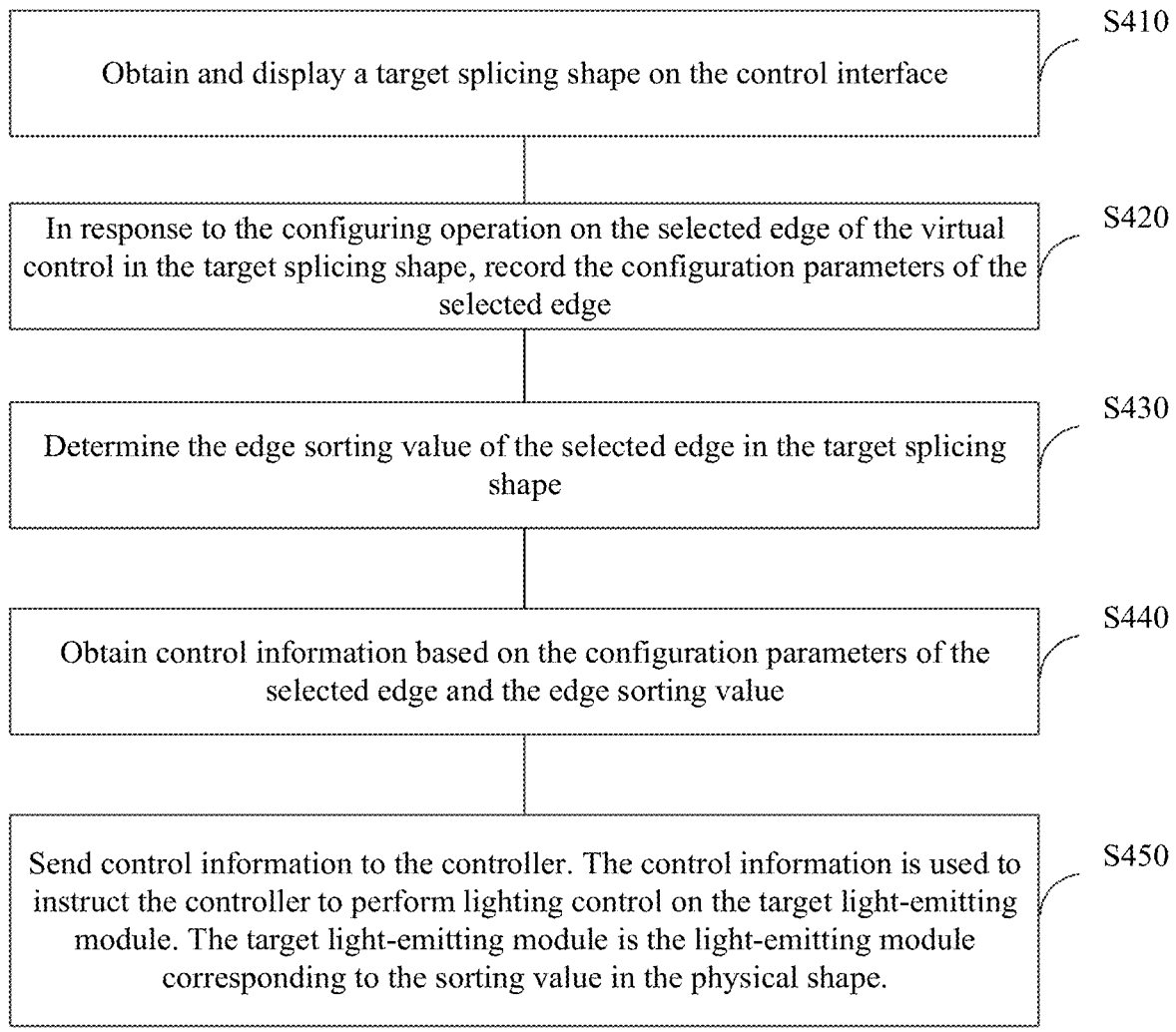
FIG. 6 shows a schematic flowchart of another light-emitting device control method provided by an embodiment of the present disclosure.

Referring to FIG. 6, FIG. 6 shows another method for controlling a light-emitting device provided by an embodiment of the present disclosure. The method for controlling the light-emitting device is applied to a terminal device configured with a control interface. The terminal device is communicatively connected to the light-emitting device, and the light-emitting device includes a controller and at least one light-emitting module, and the method may include the following Step S410 to Step S450.

Step S410: Obtain and display a target splicing shape on the control interface.

In some embodiments, the terminal device may respond to the splicing configuring operation, and splice the virtual controls corresponding to the light-emitting modules into a target splicing shape on the control interface. As an implementation manner, the terminal device can perform the following steps A to D to splice the virtual controls corresponding to the light-emitting modules into the target splicing shape on the control interface.

Step A, in response to the splicing configuring operation, determine an initial virtual control on the control interface. An initial virtual control may correspond to a light-emitting module and have the same shape as its corresponding light-emitting module. The initial virtual control may represent the first virtual control newly created/added by the user through a splicing configuring operation. The splicing configuring operation refers to the user's operation for creating/adding virtual controls on the control interface.

Figure 7:
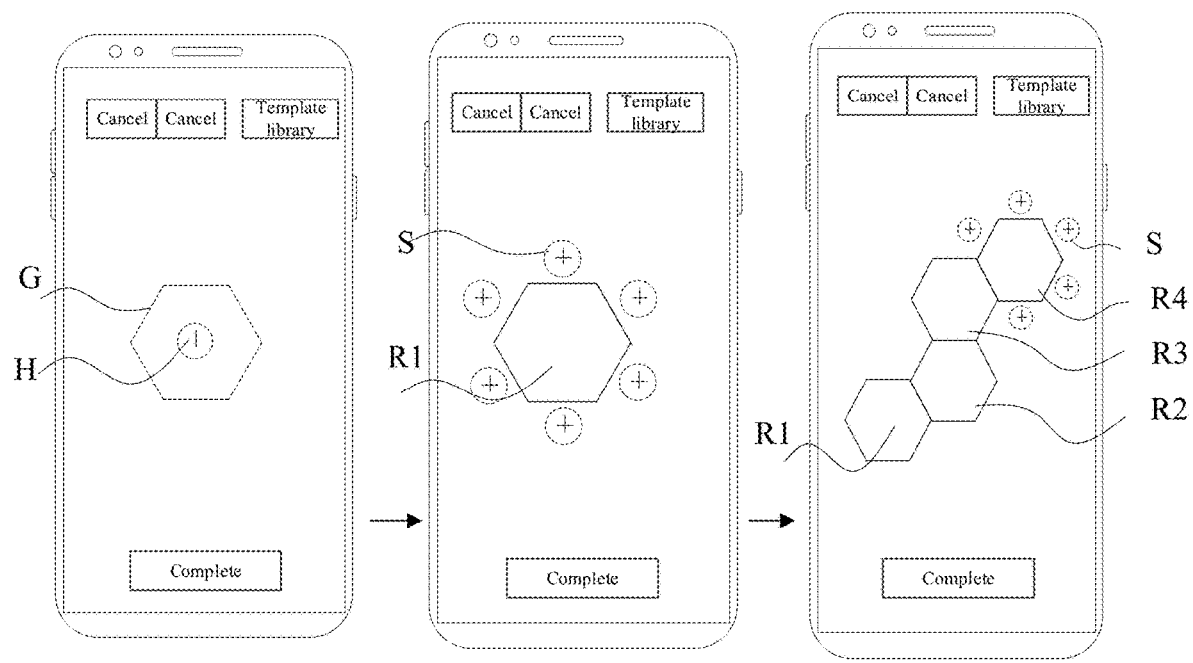
FIG. 7 shows a schematic diagram of determining an initial virtual control in the light-emitting device control method provided by an embodiment of the present disclosure.

As an implementation manner, as shown in FIG. 7, when the user needs to add a target splicing shape on the control interface, the user can touch the required position G (such as touching the new button H), and the terminal device receives the touch operation from the control interface, and generates and displays the initial virtual control R1. At this time, the initial virtual control R1 should be understood as the first virtual control newly created by the user through the splicing configuring operation.

Figure 8:
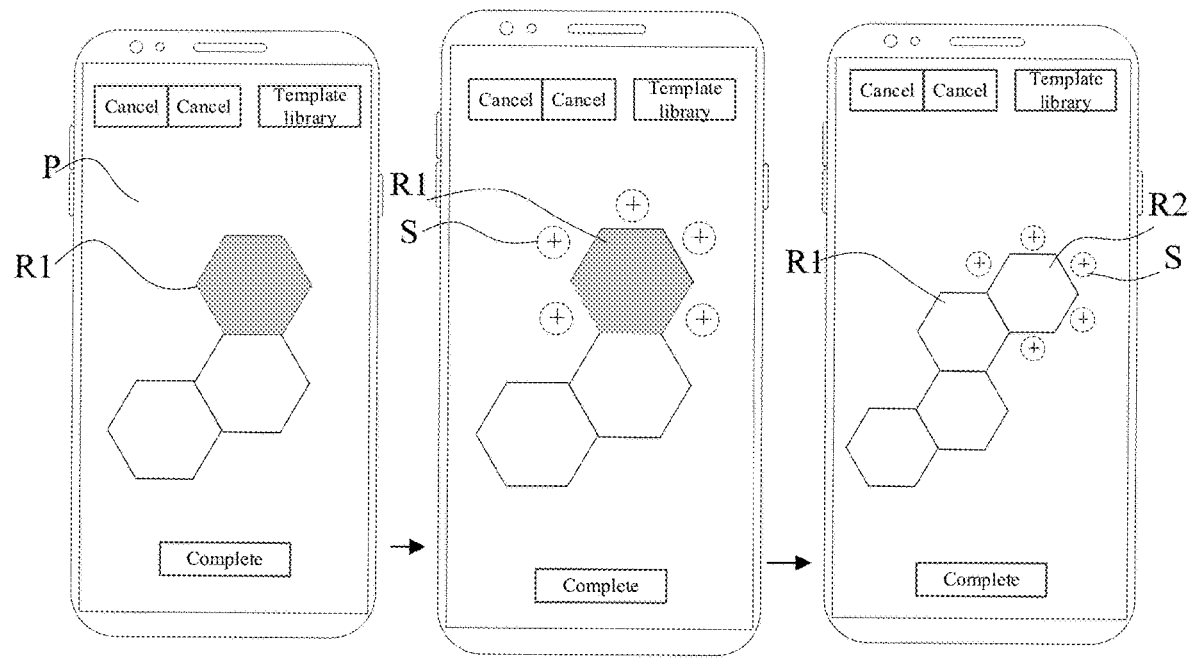
FIG. 8 shows a schematic diagram of determining an initial virtual control in another light-emitting device control method provided by an embodiment of the present disclosure.

As another implementation manner, the terminal device is configured with a template library of target splicing shapes. One or more template shapes are pre-stored in the template library. These template shapes are used for the user to select according to the user's own needs to reduce time for the user to perform splicing, improving user experience. As shown in FIG. 8, when the user calls the template shape in the template library of the target splicing shape for editing, the control interface of the terminal device can display the called template shape P according to the user's operation. When the user edits the template shape P according to the actual needs, the user can touch the corresponding virtual control at the location where a new virtual control needs to be added, and the terminal device determines that the initial virtual control is a virtual control based on the touch operation received by the control interface (for example, it can be highlighted with different colors, or the virtual control R1 can be highlighted through other icons as the initial virtual control). At this time, the initial virtual control should be understood as the first virtual control determined by the user through the splicing configuring operation.

Step B: Based on the shape of the initial virtual control, two or more additional controls are generated around the initial virtual control. The additional controls are used to indicate the display position of the next virtual control.

As an implementation manner, once the initial virtual control is determined, the user can add the next virtual control according to the actual needs. In one embodiment, as shown in FIGS. 7 and 8, the terminal device provides the user with a touch button to add the next virtual control (such as additional control S). The user adds control S by touching, and can add the virtual control in the location where control S is located. Specifically, based on the shape of the initial virtual control R1, the terminal device determines the display position of the additional control S, and displays the additional control S at the display position, which is adjacent to the initial virtual control R1. If the initial virtual control R1 is a polygon, the number of additional controls S can be multiple, and the display position of each additional control S can be adjacent to an edge of the initial virtual control R1. Or, according to the outline of the initial virtual control R1, multiple display positions are defined around the initial virtual control R1, and each display position can be used as a position for an additional control S. At this time, the number and position of the added controls S do not need to be related to the polygonal structure of the initial virtual control R1.

Step C, in response to an adding operation, determine the target adding position among the two or more added controls, and display the next virtual control at the target adding position.

As an implementation manner, two or more added controls S are displayed around the initial virtual control R1 on the control interface. The user can select any one of the added controls S to add a new virtual control according to the splicing requirements. When the terminal device receives the selection operation for the additional control S, the display position where the selected additional control S is located and is used as the target adding position, and the next virtual control R2 is displayed at the target adding position.

Step D: Based on the shape of the next virtual control, two or more added controls are generated around the next virtual control. The added controls are used to indicate the adding position of the next virtual control. In the embodiments of the present disclosure, after a new virtual control is added, the added controls can continue to be displayed according to step B, and new virtual controls can continue to be added based on the user's operation. Details are not repeated again here.

In response to the adding operation, steps A and D are executed until a target confirmation instruction is received and the target splicing shape is obtained. The target confirmation instruction indicates that the user has completed adding the virtual control. In one embodiment, the target confirmation instruction can be generated based on the user's touch operation. For example, if the user touches the "Complete Splicing" or "Complete" button, the target confirmation instruction is generated accordingly. At this time, the shape formed by the virtual controls displayed on the control interface is the target splicing shape.

Step S420: In response to the configuring operation on the selected edge of the virtual control in the target splicing shape, record the configuration parameters of the selected edge.

As an implementation manner, after the terminal device displays the target splicing shape, the user can select an edge on any virtual control in the target splicing shape, that is, select the edge to set parameters. In one embodiment, for the specific implementation of step S420, reference may be made to the description of Step S320 provided in the above embodiment, which will not be described again here.

Step S430: Determine the edge sorting value of the selected edge in the target splicing shape.

As an implementation manner, the terminal device can determine the splicing order value of the virtual control corresponding to the light-emitting module in the target splicing shape, and use the splicing order value as the sorting value of the virtual control in the target splicing shape. Further, according to the sorting value of the virtual control, the terminal device can determine the edge sorting value of the selected edge in the target splicing shape.

For example, the terminal device can use the order in which the user creates virtual controls through the splicing configuring operation as the splicing order values of the virtual controls in the target splicing shape, and use the splicing order values as the sorting values of the virtual controls in the target splicing shape. Further, after the terminal device obtains the sorting value of the virtual control corresponding to the light-emitting module in the target splicing shape, it can calculate the edge ordering value of the selected edge in the target splicing shape based on the number of edges of the virtual control corresponding to the light-emitting module and the sorting value of the virtual control. For example, when each light-emitting module includes multiple edge light-emitting units that are cascaded in sequence, such as a first light-emitting unit, a second light-emitting unit, a third light-emitting unit, a fourth light-emitting unit, and a fifth light-emitting unit that are cascaded in sequence, then in the light-emitting module, the internal sorting values of the first light-emitting unit, the second light-emitting unit, the third light-emitting unit, the fourth light-emitting unit, and the fifth light-emitting unit in sequence are known. Then, the internal sorting values of the multiple edges of the virtual control corresponding to the light-emitting module are known. Thus, based on the sorting value of the virtual control corresponding to the light-emitting module in the target splicing shape, and the internal sorting values of the multiple edges, the terminal device can calculate the edge ordering value of the selected edge in the target splicing shapes. Specifically, assuming that the target splicing shape includes two virtual controls, respectively called a first virtual control and a second virtual control, then the sorting value of the first virtual control is 1, and the sorting value of the second virtual control is 2. The virtual control includes a first edge, a second edge, a third edge, a fourth edge, and a fifth edge connected in sequence, and each edge is provided with a corresponding light-emitting unit, then the internal sorting value of the first edge is 1, the internal sorting value of the second edge is 2, the internal sorting value of the third edge is 3, the internal sorting value of the fourth edge is 4, and the internal sorting value of the fifth edge is 5. Further, to calculate the sorting value of the third edge of the second virtual control, in in one embodiment, the sorting value 2 of the second virtual control and the internal sorting value 3 of the third edge can be combined to determine the sorting value of the third edge to be 2-3, or an array [2, 3]. In another embodiment, the number of edges N of the first virtual control and the internal sorting value 3 of the third edge can be combined to calculate the sorting value of the third edge to be N+3.

Step S440: Obtain control information based on the configuration parameters of the selected edge and the edge sorting value.

In the embodiments of the present disclosure, the control information can be understood as information used to control the light-emitting device, which may include, but not limited to: the light-emitting parameters of the light-emitting modules and/or the edge light-emitting units of the light-emitting device (such as color parameters, brightness parameters, duration parameters, etc., the lighting parameters can be obtained according to the configuration parameters), the sorting value of the light-emitting modules and/or the edge light-emitting unit of the light-emitting device. The control information can be used as the basis for the terminal device to control the light-emitting device (for example, the control information is used as the basis for generating control instructions). When the terminal device obtains the control information, it can directly generate control instructions based on the control information. The control instructions can be directly parsed and executed by the light-emitting modules or, after the terminal device obtains the control information, it can transfer the control information to the controller of the light-emitting device, and the controller can generate a control instruction based on the control information, and the control instruction can be directly parsed and executed by the light-emitting modules.

The light-emitting device control method provided by this disclosure uses the light-emitting device to sequentially intercept control instructions according to the splicing order to realize the lighting effect control of the light-emitting device by the terminal device. Optionally, the IC control chip used in the light-emitting device integrates circuits such as single-line return-to-zero code digital interface circuitry, and output-data automatic shaping and forwarding circuitry. The single-line return-to-zero code means that the high level is only maintained for a period of time during the entire symbol period, and returns to zero level the rest of the time. That is, the electrical pulse width of the return-to-zero code is narrower than the symbol width (that is, the duty cycle is <1), each pulse returns to zero before the end of a symbol. Single-line return-to-zero codes can be widely used in channel transmission. The built-in signal shaping processing circuit of the IC control chip can output the waveform after receiving the control instruction, thereby ensuring that the line waveform distortion will not accumulate.

In some embodiments, the terminal device may generate a control instruction in the data format of a single-wire return-to-zero code based on the control information. The control instruction may include multiple control fields, that is, multiple segments of single-line return-to-zero codes. The multiple control fields correspond to the plurality of light-emitting modules in the physical shape. Each control field includes control parameters for being parsed by the light-emitting module. The control parameters are determined based on the configuration parameters and the sorting value of the selected virtual control.

Optionally, based on the total number N of virtual controls in the target splicing shape, the terminal device may determine the number of control fields to be N, or determine the number of control fields to be N based on the sorting value being N. The N control fields are sorted in sequence. Further, based on the configuration parameters and sorting values, the terminal device configures control parameters for each control field to generate the control instruction, where the sorting order of the control field configured with control parameters and the sorting values are same.

Specifically, as an implementation manner, the terminal device can generate a control instruction based on the configuration parameters and edge sorting values of the selected edges, and send the control instructions to the light-emitting device as control information. Specifically, the terminal device can determine the number of control fields in the control instruction to be N based on the N number of virtual controls corresponding to the edge light-emitting units of the light-emitting module in the target splicing shape. Further, based on the configuration parameters and edge sorting values of the selected edges, the terminal device can determine the control parameters for each control field to generate the control instruction.

For example, if the target splicing shape has virtual controls corresponding to two hexagonal light-emitting modules, and the corresponding light-emitting modules each include six edge light-emitting units, then the number of effective corresponding edges of each virtual control is 6. The total number of edges of the two virtual controls in the target splicing shape is 12. That is, the control instruction has 12 fixed-length control fields. To control the light-emitting module corresponding to the first virtual control not to emit light, and the light-emitting module corresponding to the second virtual control to emit red light, the terminal device can generate the corresponding control fields based on the edge sorting values of all edges and the configuration parameters (control codes). The data format of the generated control instruction is as follows:

(0x00 0x00 0x00) (0x00 0x00 0x00) (0x00 0x00 0x00) (0x00 0x00 0x00) (0x00 0x00 0x00) (0x00 0x00 0x00) (0xFF 0x00 0x00) (0xFF 0x00 0 x00) (0xFF 0x00 0x00) (0xFF 0x00 0x00) (0xFF 0x00 0x00) (0xFF 0x00 0x00)

where the characters in each "( )" represent the control field of the corresponding edge. For example, (0xFF 0x00 0x00) is the control field corresponding to the sorting value of the selected edge on the control instruction. The control instruction has 12 fixed-byte-length segments of 24 bits. The corresponding decimal RGB data of the control field is (255 0 0). Therefore, the light-emitting unit that obtains this control field can be controlled to display red light. The first to sixth segments correspond to the edges with an edge sorting value of 1 to 6, that is, from the seventh segment to the twelfth segment correspond to edges with an edge sorting value of 7 to 12.

In other embodiments, the terminal device can directly package the configuration parameters of the selected edge and the sorting value of the selected edge to generate control information, and send the control information to the light-emitting device, so that the light-emitting device generates the control instruction based on the control information.

Step S450: Send control information to the controller. The control information is used to instruct the controller to perform lighting control on the target light-emitting module. The target light-emitting module is the light-emitting module corresponding to the sorting value in the physical shape.

In one embodiment, for the specific implementation of step S450, reference may be made to the description of step S340 provided in the above embodiment, which will not be described again here.

According to the light-emitting device control method provided by this disclosure, the terminal device can obtain and display the target splicing shape on the control interface, and can further record the configuration parameters of the selected edge in response to the configuring operation on the selected edge of the virtual control in the target splicing shape, and determine the edge sorting value of the selected edge in the target splicing shape. Further, control information can be obtained based on the configuration parameters and edge sorting value of the selected edge, and the control information can be sent to the controller. Thus, the terminal device can generate corresponding control information based on the edge sorting value and configuration parameters of the virtual control in the target splicing shape, and send to the controller of the light-emitting device, thereby controlling the lighting of the target light-emitting module, which avoids the need for each light-emitting module to establish communication connection with the terminal device, improving control efficiency.

Referring to FIG. 9, FIG. 9 shows another method for controlling a light-emitting device provided by an embodiment of the present disclosure. This method is applied to a light-emitting device. The light-emitting device includes a controller and a plurality of light-emitting modules. The light-emitting device communicates with a terminal device. The plurality of light-emitting modules are connected and spliced according to a target splicing shape. The target splicing shape is determined by the splicing shape of the virtual control displayed on the control interface of the terminal device. The light-emitting device control method may include the following steps S510 to S520.

Step S510: The controller receives the control information sent by the terminal device. The control information is generated by the terminal device based on the received configuring operation of the selected virtual control. The control information includes the configuration parameters of the selected virtual control and the sorting value of the selected virtual control in the target stitching shape.

In one embodiment, for the specific implementation of step S510, reference may be made to the description of step S340 provided in the above embodiments, which will not be described again here.

Step S520: The controller performs lighting control on the target light-emitting module according to the control information, and the target light-emitting module is the light-emitting module corresponding to the sorting value in the physical shape.

In the embodiments of this disclosure, the control information is generated by the terminal device. The terminal device can generate a control instruction according to the control information and send it to the light-emitting device as control information, so that the light-emitting module obtains the control information, that is, the control instruction, directly parses and executes the control instruction. Specifically, the controller of the light-emitting device can receive the control information and send the control information, that is, the control instruction directly to the target light-emitting module, and the target light-emitting module parses and executes the control instruction. The controller of the light-emitting device can also generate the control instruction based on the obtained control information and based on the configuration parameters and sorting values contained in the control information, and send the control instruction to the target light-emitting module. Further, the target light-emitting module parses and execute the control instruction.

Optionally, the control instruction may include multiple control fields. The multiple control fields correspond one-to-one to the plurality of light-emitting modules spliced according to the target splicing shape. Each control field includes control parameters for the light-emitting module to parse, and the control parameters are determined based on the configuration parameters and sorting values of the selected virtual control.

Optionally, the controller can determine the number of control fields to be N based on the N number of virtual controls in the target splicing shape, where the N control fields are sorted in sequence. Further, based on the configuration parameters and sorting values, the controller can determine control parameters for each control field to generate a control instruction, where the sorting order of the control fields configured with the control parameter is the same as the sorting values.

In one embodiment, the light-emitting device receives the control information sent by the terminal device, and can generate a control instruction according to the control information. The control information can be generated by the terminal device by directly packaging the configuration parameters of the selected edge and the sorting value of the selected edge. The light-emitting device can generate a control instruction based on the control information (the control instruction can be considered to include the control information), and then send the control instruction to the light-emitting modules. The control information is obtained by the terminal device based on the configuration parameters of the selected edge and the sorting of the selected edge.

In some embodiments, the controller can issue the control instruction to the target light-emitting module, and the target light-emitting module can parse and execute the control instruction. Specifically, the controller can issue the control instruction to the first light-emitting module, which is the first light-emitting module among the plurality of light-emitting modules arranged in sequence. For example, the target splicing shape is composed of virtual controls corresponding to six light-emitting modules. The control instruction sent by the controller is (0x0A 0x00 0x00) (0x0B 0x00 0x00) (0x0C 0x00 0x00) (0x0D 0x00 0x00) (0x0E 0x00 0x00) (0x0F 0x00 0x00), where the characters within each "( )" represent the control field of a corresponding virtual control.

The first light-emitting module intercepts the first control field among the N control fields of the received control instruction, and sends the intercepted remaining (N−1) control fields to the second light-emitting module. The second light-emitting module is the next light-emitting module adjacent to the first light-emitting module among the plurality of light-emitting modules that are sorted in sequence. Based on the above example, the sorting value of the first light-emitting module is 1, and the control field of the control instruction corresponding to the value 1 is intercepted in sequence. That is, after intercepting the first control field (0x0A 0x00 0x00) in the control instruction, the remaining control fields (0x0B 0x00 0x00) (0x0C 0x00 0x00) (0x0D 0x00 0x00) (0x0E 0x00 0x00) (0x0F 0x00 0x00) are sent to the next light-emitting module (the second light-emitting module) with a sorting value of 2. The light-emitting module with the sorting value of 2 is the light-emitting module adjacent to the first light-emitting module.

The second light-emitting module intercepts the first control field among the (N−1) control fields of the received control instruction, and sends the intercepted remaining (N−2) control fields to the third light-emitting module adjacent to the second light-emitting module. Based on the above example, the second light-emitting module has a sorting value of 2, and the control field of the control instruction corresponding to the value 2 is intercepted in sequence. That is, after intercepting the first control field (0x0B 0x00 0x00) in the received control instruction, the remaining control fields (0x0C 0x00 0x00) (0x0D 0x00 0x00) (0x0E 0x00 0x00) (0x0F 0x00 0x00) are sent to the next light-emitting module with a sorting value of 3 (the third light-emitting module), the light-emitting module with a sorting value of 3 is the light-emitting module adjacent to the second light-emitting module.

. . . And so on.

The (N−1)-th light-emitting module intercepts the first control field from the two control fields in the received control instruction, and sends the intercepted remaining control field to the N-th light-emitting module. Based on the above example, the sorting value of the fifth light-emitting module is 5, and the controls field corresponding to the sorting value 5 in the control instruction (0x0E 0x00 0x00) (0x0F 0x00 0x00) are intercepted in sequence. That is, after the first control field (0x0E 0x00 0x00) in received control instruction is intercepted, the remaining control field (0x0F 0x00 0x00) is sent to the next light-emitting module (the sixth light-emitting module) with a sorting value of 6. The light-emitting module with a sorting value of 6 is the light-emitting module adjacent to the fifth light-emitting module, also the last-sorted light-emitting module in the physical splicing shape corresponding to the target splicing shape.

The N-th light-emitting module receives the control field sent by the (N−1)-th light-emitting module. Based on the above example, the sixth light-emitting module receives the control field (0x0F 0x00 0x00) sent by the fifth light-emitting module.

Thus, each light-emitting module can receive the control instruction, and then parse and execute the control parameters in the intercepted control field. Compared with the master-slave communication method, in the light-emitting device control method provided by this disclosure, each light-emitting module of the light-emitting device does not need to directly establish a connection relationship with the terminal device. After the light-emitting device receives the control instruction sent from the terminal device, each light-emitting module/edge light-emitting unit only needs to intercept the control field corresponding to its own sorting value in the control instruction to complete the lighting effect display, thereby simplifying the steps by which the terminal device sends control instructions to each light-emitting module one by one, and then each light-emitting device receives the control instruction from the terminal device, efficiently controlling the lighting effect display of the light-emitting device through one-time generation and one-time transmission, avoiding identification errors that are easy to occur in the master-slave communication method.

In one embodiment, each light-emitting module can directly execute the control instruction after intercepting the corresponding control field, or can wait for a trigger instruction inputted by the controller, and execute the received control instruction at the same time to ensure that the response time of the overall lighting effect of the light-emitting device is synchronized. For example, the trigger instruction inputted by the controller can be an execution instruction sent to a plurality of light-emitting modules in sequence, and a timer is added to the execution instruction. After the light-emitting module receives the trigger instruction, the timer starts counting, and the light-emitting module is triggered to execute the aforementioned control instruction after the timer expires, thereby ensuring that the plurality of light-emitting modules can respond to the control instruction at the same time. For another example, the trigger instruction inputted by the controller can be a low-voltage-level input signal. Through the low-voltage-level input signal, the controller can pull down the levels of all light-emitting modules at the same time. After the controller's built-in timer expires, the controller can restore the high-voltage-level input, the light-emitting modules are triggered to directly execute the aforementioned control instruction, thereby ensuring that plurality of light-emitting modules can respond to the control instruction at the same time. Specifically, the light-emitting module that receives the control instruction can parse the intercepted control field and obtain corresponding control parameters, the light-emitting module executes the control parameters in response to a low-voltage-level input signal lasting a predetermined period of time.

Figure 10:
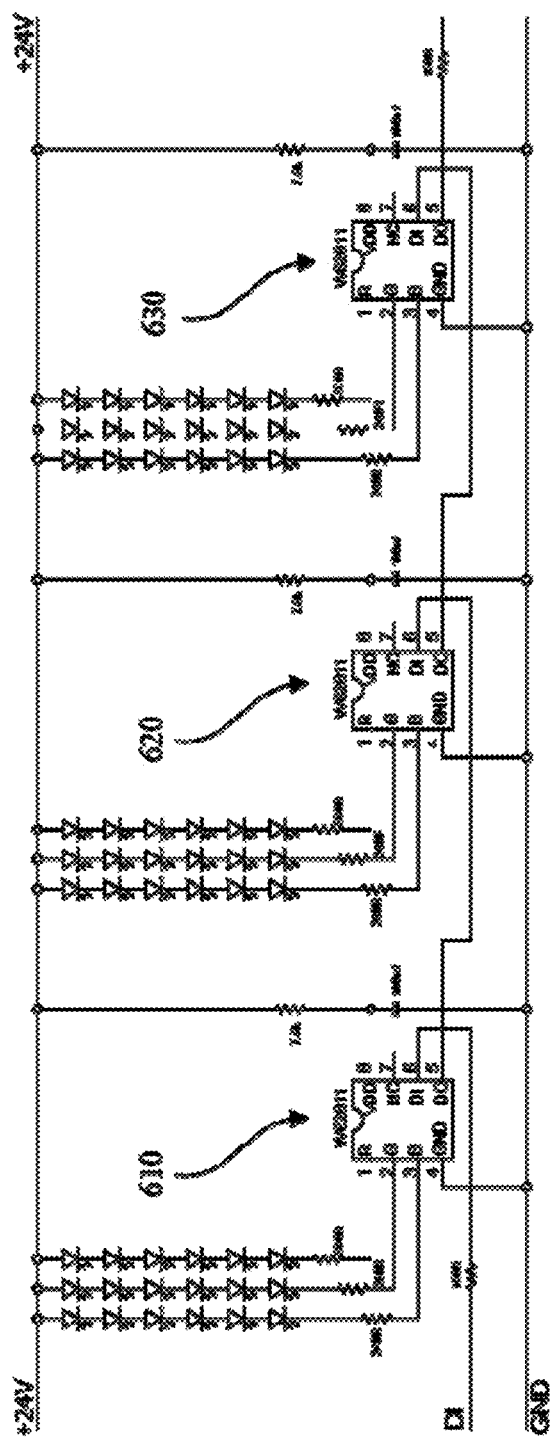
FIG. 10 shows a schematic diagram of a physical connection of a light-emitting unit provided by an embodiment of the present disclosure.

For illustrative purposes, in order to further illustrate these embodiments, examples will be given below with reference to specific drawings. Referring to FIG. 10, FIG. 10 shows the physical connection relationship between the three light-emitting units in the light-emitting module. The light-emitting unit uses a WS2811 chip, the control instruction is transmitted between the first light-emitting unit 610, the second light-emitting unit 620, and the third light-emitting unit 630 through data transmission lines. The light-emitting device receives a control instruction sent from the terminal device. The control instruction is used to control the lighting effect of the first light-emitting unit 610, the second light-emitting unit 620, and the third light-emitting unit 630. The control instruction consists of three fixed-length control fields. Each fixed-length control field can be 24-bit single-line return-to-zero code data. The DI terminal receives the control instruction transmitted from the controller. After the 3*24-bit length control instruction is obtained by the first light-emitting unit 610, the first light-emitting unit 610 intercepts the control field of a fixed length of 1*24 bit from the head of the control instruction, and forwards the intercepted remaining 2*24-bit length control instruction, after being shaped and amplified by the internal shaping and processing circuit, to the next cascaded second light-emitting unit 620 through the DO terminal.

Further, after the 2*24-bit length control instruction is obtained by the second light-emitting unit 620, the second light-emitting unit 620 intercepts the control field with a fixed length of 1*24 bit from the head of the control instruction, and forwards the intercepted remaining 1*24 bit length control instruction, after being shaped and amplified by the internal shaping and processing circuit, to the next cascaded third light-emitting unit 630 through the DO terminal. At this point, the light-emitting device completes the transmission of the control instruction.

As an implementation manner, after each light-emitting unit obtains the intercepted remaining control instruction, it can perform lighting effect display based on the remaining control instruction. For example, the code of the control instruction for controlling the lighting effect of the first lighting unit 610, the second lighting unit 620, and the third lighting unit 630 is as follows:

$$(0 \times 00\, 0 \times 00\, 0 \times 00)(0 \times 00\, 0 \times 00\, 0 \times 00)(0 \times FF\, 0 \times 00\, 0 \times 00),$$

where, in this code, the length of each segment is 24 bits, 0x00 can be represented as 0, 0xFF can be represented as 1, (0x00 0x00 0x00) can mean to control the light-emitting unit not to emit light, (0xFF 0x00 0x00) can mean to control the light-emitting unit to emit red light. Thus, the code means that the first light-emitting unit 610 and the second light-emitting unit 620 do not emit light, and the third light-emitting unit 630 emits red light.

In the light-emitting device control method provided by this disclosure, the controller can receive control information sent by the terminal device. The control information is generated by the terminal device based on the received configuring operation on the selected virtual control. The control information includes the configuration parameters of the selected virtual control and the sorting value of the selected virtual control in the target splicing shape. Further, the controller performs lighting control on the target light-emitting module according to the control information. Therefore, the light-emitting device can adopt an interception and execution method according to the control instruction, realizing the lighting control of the light-emitting unit corresponding to the edge number in the physical splicing shape, avoiding the participation of the control unit, reducing the recognition error rate, and thus effectively improving the control efficiency of the light-emitting device.

Figure 11:
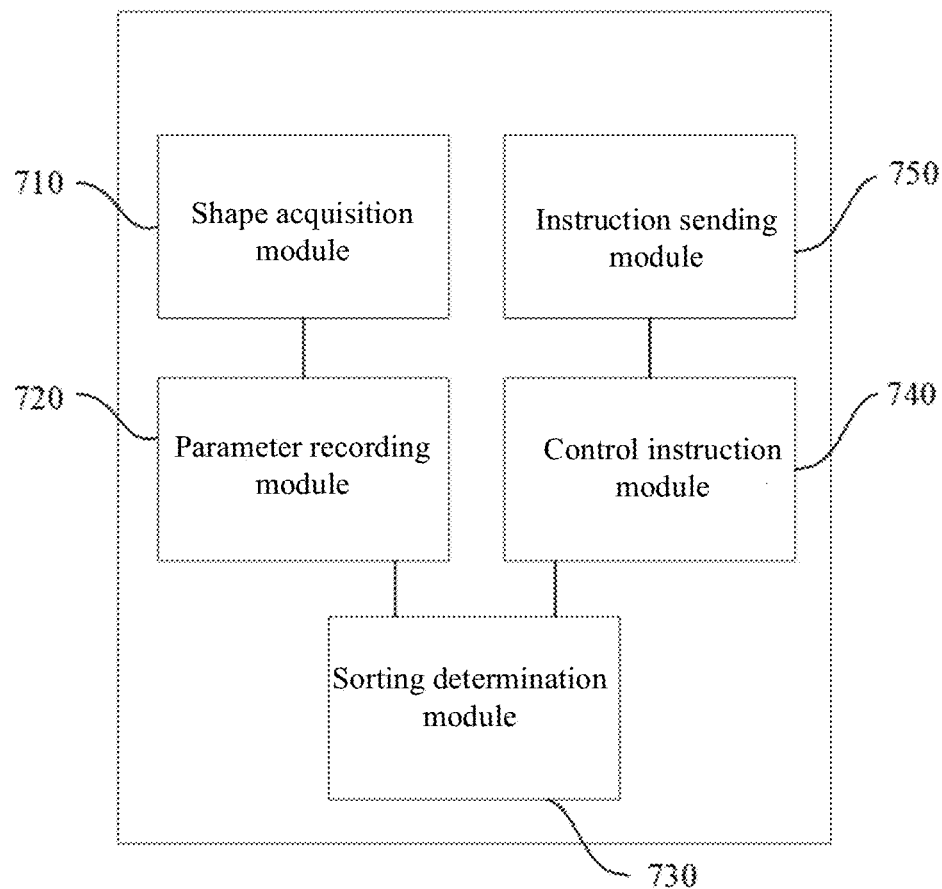
FIG. 11 shows a module block diagram of a control apparatus for a light-emitting device provided by an embodiment of the present disclosure.

Referring to FIG. 11, FIG. 11 shows a module block diagram of a control apparatus 700 of a light-emitting device provided by an embodiment of the present disclosure. The control apparatus of the light-emitting device runs on a terminal device equipped with a control interface. The terminal device is connected to the light-emitting device. The light-emitting device includes a controller and a plurality of light-emitting modules. The control apparatus includes the following.

A shape acquisition module 710, which is used to obtain and display a target splicing shape on the control interface. The target splicing shape includes multiple visual virtual controls. The target splicing shape is used to instruct the user to splice the controller and plurality of light-emitting modules into a physical shape consistent with the target splicing shape.

A parameter recording module 720, which is configured to, in response to a configuring operation of the selected virtual control in the target splicing shape, record the configuration parameters of the virtual control.

A sorting determination module 730, which is used to determine the sorting value of the selected virtual control in the target splicing shape;

A control instruction module 740, which is used to obtain control information according to the configuration parameters and sorting value.

An instruction sending module 750, which is used to send control information to the controller. The control information is used to instruct the controller to perform lighting control on the target light-emitting module. The target light-emitting module is the light-emitting module corresponding to the sorting value in the physical shape.

In some embodiments, the control instruction module 740 may be specifically used to package the configuration parameters and sorting value to generate control information;

The instruction sending module 750 can be specifically used to send control information to the controller. The control information is used to instruct the controller to generate a control instruction according to the configuration parameters and sorting value, and send the control instruction to the target light-emitting module to control the lighting of the target light-emitting module. The control instructions are parsed and executed by the target light-emitting module.

In some embodiments, the control instruction module 740 can also be specifically configured to determine control information according to the configuration parameters and the sorting value, where the control information includes the configuration parameters of the target light-emitting module corresponding to the sorting value, and to generate the control instruction according to the control information;

The instruction sending module 750 can also be specifically used to send the control instruction to the controller. The control instruction is used to instruct the controller to forward the control instruction to the target light-emitting module to control the lighting of the target light-emitting module, where the control instruction is parsed and executed by the target light-emitting module.

In some embodiments, the shape of the virtual control is consistent with the shape of the light-emitting module. The light-emitting module is a polygonal structure and includes an edge light-emitting unit disposed on at least one edge of the polygonal structure. The parameter recording module 720 can be specifically used to, in response to the configuring operation on the selected edge of the virtual control in the target splicing shape, record the configuration parameters of the selected edge.

The sorting determination module 730 may be specifically configured to determine the edge sorting value of the selected edge in the target splicing shape.

The control instruction module 740 can also be specifically used to obtain control information based on the configuration parameters and edge sorting values of the selected edges. The control information is also used to instruct the controller to perform lighting control on the target edge light-emitting unit, and the target edge light-emitting unit is the edge-emitting unit corresponding to the edge sorting value in the physical shape.

In some embodiments, the sorting determination module 730 may be specifically configured to determine the splicing order value of the virtual control in the target splicing shape; and use the splicing order value as the sorting value of the selected virtual control in the target splicing shape.

In some embodiments, the control instructions include multiple control fields, and the multiple control fields correspond to the plurality of light-emitting modules in the physical shape. Each control field includes control parameters for the light-emitting module to parse, and the control parameters are determined based on configuration parameters and the sorting value of the selected virtual control. the selected. The control instruction module 740 may include the following.

A determination unit, which is used to determine, based on the total number N of virtual controls in the target splicing shape, the number of control fields to be N, and the N control fields are sorted in sequence.

A generation unit, which is configured to determine control parameters for each control field based on the configuration parameters and the sorting value to generate the control instruction, and the sorting order of the control field configured with the control parameter is the same as the sorting value.

In some embodiments, the shape acquisition module 710 may include: a splicing unit, configured to splice the virtual controls corresponding to the light-emitting modules into a target splicing shape on the control interface in response to the splicing configuring operation.

In some embodiments, the splicing unit can be specifically used to: in step A, in response to the splicing configuring operation, determine an initial virtual control on the control interface; in step B, based on the shape of the initial virtual control, generate two or more additional virtual controls around the initial virtual control, where the additional control is used to indicate the display position of the next virtual control; in step C, in response to the adding operation, determine the target adding position among two or more additional controls, and display the next virtual control at the target adding position; in step D, based on the shape of the next virtual control, generate two or more additional controls around the next virtual control, and the additional control is used to indicate the adding position of the next virtual control. That is, in response to adding operations, step A to step D are performed until a target confirmation instruction is received and the target splicing shape is obtained. The target confirmation instruction indicates that the user has completed adding virtual controls.

Figure 12:
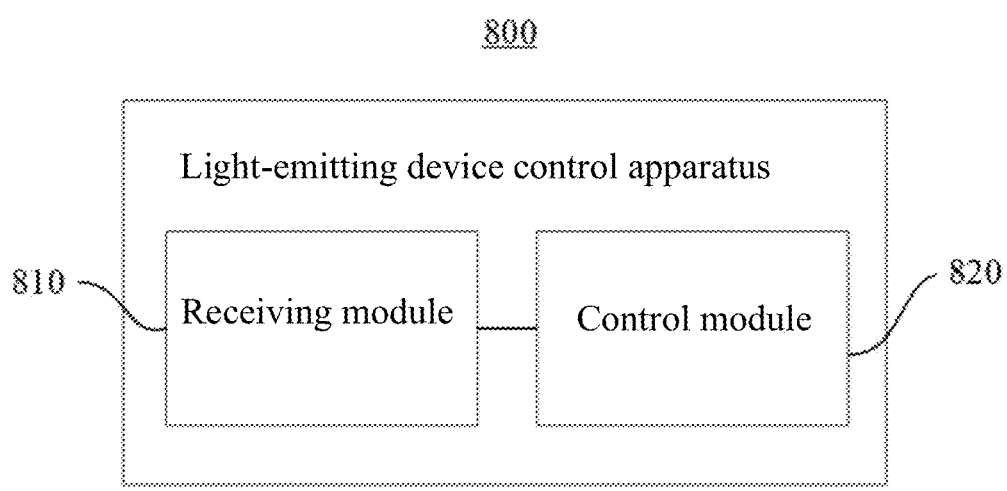
FIG. 12 shows a module block diagram of another control apparatus for a light-emitting device provided by an embodiment of the present disclosure.

Referring to FIG. 12, FIG. 12 shows a module block diagram of a control apparatus 800 for a light-emitting device provided by an embodiment of the present disclosure. The control apparatus of the light-emitting device runs on the light-emitting device. The light-emitting device includes a controller and at least one light-emitting module. The light-emitting device is communicatively connected to the terminal device. The control apparatus includes the following.

A receiving module 810, which is used to receive control information sent by the terminal device.

A control module 820, which is used to control the lighting of the light-emitting module according to the control information.

In some embodiments, the control module 820 may include:

A generation unit, which is used by the controller to generate a control instructions based on the control information and according to the configuration parameters and sorting value.

A first sending unit, which is used by the controller to send the control instruction to the target light-emitting module.

A first parsing unit is used for the target light-emitting module to parse and execute control instructions.

In some embodiments, the control information is a control instruction generated by the terminal device and directly parsed and executed by the light-emitting module, and the control module 820 may also include:

A second sending unit, which is used by the controller to send the control instruction to the target light-emitting module.

A second parsing unit, which is used for the target light-emitting module to parse and execute the control instruction.

In some embodiments, the control instruction includes multiple control fields, and the multiple control fields are in one-to-one correspondence with the plurality of light-emitting modules spliced according to the target splicing shape. Each control field includes control parameters for the light-emitting module to parse, and the control parameters are determined based on the configuration parameters and sorting value of the selected virtual control. The generation unit can be specifically used to determine the number of control fields to be N according to the N number of virtual controls in the target splicing shape, where the N control fields are sorted in sequence. Based on the configuration parameters and sorting values, control parameters are configured for each control field to generate the control instruction, where the sorting order of the control field configured with the control parameters is the same as the sorting value.

In some embodiments, the first sending unit or the second sending unit may be specifically used by the controller to send the control instruction to the first light-emitting module, which is the first light-emitting module in the sequence of plurality of light-emitting modules.

The first light-emitting module intercepts the first control field among the N control fields of the received control instruction, and sends the intercepted remaining (N−1) control fields to the second light-emitting module. The second light-emitting module is the next light-emitting module adjacent to the first light-emitting module among the plurality of light-emitting modules arranged in sequence.

The second light-emitting module intercepts the first control field among the (N−1) control fields of the received control instruction, and sends the intercepted remaining (N−2) control fields to the adjacent third light-emitting module.

. . .

The (N−1)-th light-emitting module intercepts the first control field from the two control fields of the received control instruction, and sends the intercepted remaining control field to the N-th light-emitting module.

The Nth light-emitting module receives the control field sent by the (N–1)-th light-emitting module.

The first parsing unit or the second parsing unit may include:

An execution sub-unit, which is used for the light-emitting module that receives the control instruction to parse the control parameters in the intercepted control field and execute them.

In some embodiments, the execution sub-unit can be specifically used to parse the intercepted control field and obtain the corresponding control parameters by the light-emitting module that receives the control instruction. The light-emitting module responds to a low-voltage-level input signal lasting for a predetermined period of time, and executes the control parameters.

Those skilled in the art can understand that for the convenience and simplicity of description, the specific working processes of the above-described apparatuses and modules can be referred to the corresponding processes in the foregoing method embodiments, and will not be described again here.

In several embodiments provided in this disclosure, the coupling between modules may be electrical, mechanical, or other forms of coupling.

In addition, each functional module in the embodiments of the present disclosure can be integrated into one processing module, or each module can exist physically alone, or two or more modules can be integrated into one module. The above integrated modules can be implemented in the form of hardware and/or software function modules.

Embodiments of the present disclosure also provide a lighting-effect control system. The lighting-effect control system includes a terminal device and a light-emitting device, the light-emitting device includes a controller and at least one light-emitting module, and the terminal device is communicatively connected to the light-emitting device.

The terminal device is used to obtain and display a target splicing shape on a control interface. The target splicing shape includes multiple visual virtual controls. The target splicing shape is used to instruct the user to splice the controller and plurality of light-emitting modules into a physical shape consistent with the target splicing shape.

The terminal device is configured to record the configuration parameters of the virtual control in response to the configuring operation of the selected virtual control in the target splicing shape.

Terminal device is used to determine the sorting value of the selected virtual control in the target splicing shape, obtain control information based on the configuration parameters and sorting value, and send the control information to the controller.

The controller is used to receive control information and perform lighting control on a target light-emitting module according to the control information. The target light-emitting module is a light-emitting module corresponding to the sorting value in the physical shape.

Figure 13:
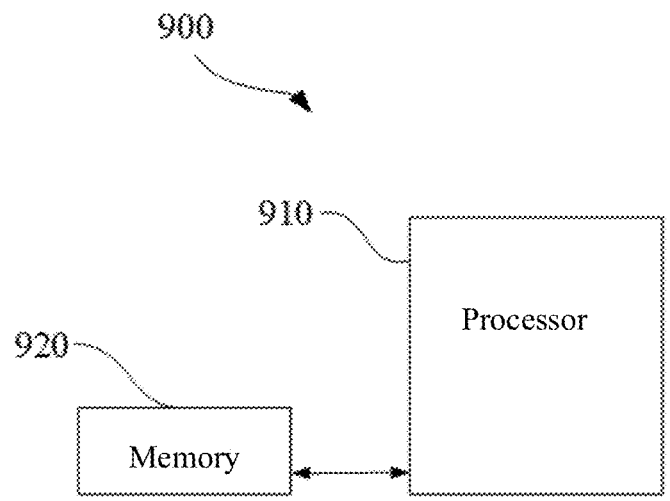
FIG. 13 is a module block diagram of an electronic device provided by an embodiment of the present disclosure.

As shown in FIG. 13, an embodiment of the present disclosure also provides an electronic device 900. The electronic device 900 may include the above-mentioned terminal device, and may also include the above-mentioned light-emitting device. The light-emitting device is configured with a controller and a light-emitting module. The electronic device 900 may also include a lighting-effect control system composing the terminal device and the light-emitting device. The electronic device 900 includes at least one processor 910 and a memory 920. The memory 920 stores computer program instructions. When the computer program instructions are executed by the processor 910, the above-mentioned light-emitting device control methods can be actually executed.

Processor 910 may include one or more processing cores. The processor 910 uses various interfaces and lines to connect various parts within the system, and by running or executing instructions, programs, code sets or instruction sets stored in the memory 920, and calling data stored in the memory 920, performs various functions and data processing. Optionally, the processor 910 may be one or more of a digital signal processing (DSP) processor, field-programmable gate array (FPGA) processor, and programmable logic array (PLA) processor implemented in hardware form. The processor 910 may integrate one or a combination of a central processing unit 910 (CPU), a graphics processor 910 (GPU), a modem, and the like. Among them, the CPU mainly handles the operating system, user interface, and applications; the GPU is responsible for rendering and drawing the display content; and the modem is used to handle wireless communications. It can be understood that the above-mentioned modem may not be integrated into the processor 910 and may be implemented solely through a communication chip.

The memory 920 may include a random access memory 920 (RAM) or a read-only memory 920 (ROM). The memory 920 may be used to store instructions, programs, codes, sets of codes, or sets of instructions. The memory 920 may include a program storage area and a data storage area, where the program storage area may store instructions for implementing an operating system, instructions for implementing at least one function (such as a touch function, a sound playback function, an image playback function, etc.), instructions for implementing various method embodiments described above, etc. The storage data area can also store data created during use of the electronic device (such as phone book, audio and video data, chat record data), etc.

Figure 14:
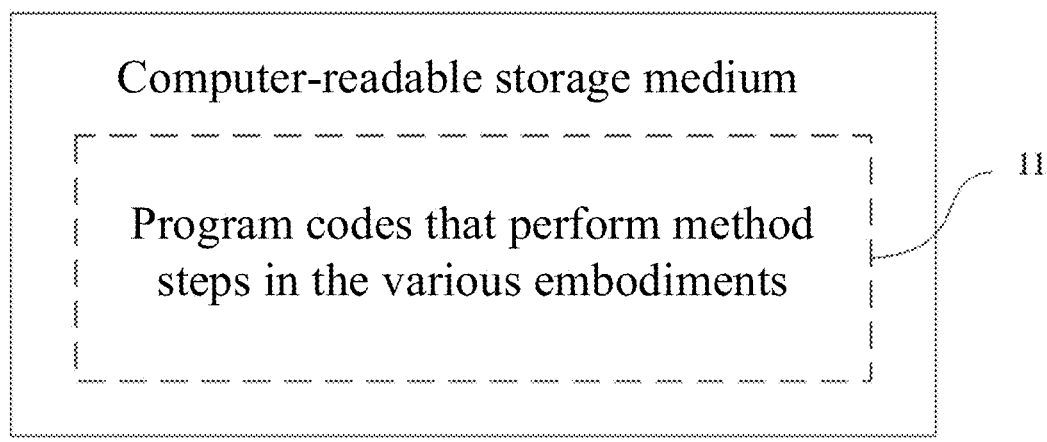
FIG. 14 is a module block diagram of a computer-readable storage medium provided by an embodiment of the present disclosure.

As shown in FIG. 14, the embodiments of the present disclosure also provide a computer-readable storage medium 10. The computer-readable storage medium 10 stores computer program instructions 11. The computer program instructions 11 can be called by the processor to execute the above method described in various embodiments.

The computer-readable storage medium may be electronic memory such as flash memory, EEPROM (electrically erasable programmable read-only memory), EPROM, hard disk, or ROM. Optionally, the computer-readable storage medium includes non-transitory computer-readable storage medium. The computer-readable storage medium 10 has storage space for program codes that execute any method steps in the above-mentioned methods. These program codes can be read from or written into one or more computer program products. The program code may be, for example, compressed in a suitable format.

The above are only preferred embodiments of the present disclosure and are not intended to limit the present disclosure in any form. Although the present disclosure has been disclosed as above with preferred embodiments, they are not intended to limit the present disclosure. Any person skilled in the art may, without departing from the scope of the technical solution of the present disclosure, use the technical content disclosed above to make equivalent embodiments with slight changes or modifications. Without departing from the scope of the technical solution of the present disclosure, any modifications, equivalent changes and modifications made to the above embodiments still fall within the scope of the technical solution of the present disclosure.

What is claimed is:

1. A light-emitting device control method applicable to a terminal device configured with a control interface, wherein the terminal device is communicatively connected to a light-emitting device, and the light-emitting device includes a controller and a plurality of light-emitting modules, the control method comprising:

obtaining and displaying a target splicing shape on the control interface, wherein the target splicing shape includes multiple visual virtual controls, and the target splicing shape is used to instruct a user to splice the controller and the plurality of light-emitting modules into a physical shape consistent with the target splicing shape;

in response to a configuring operation on a selected virtual control in the target splicing shape, recording configuration parameters of the selected virtual control;

determining a sorting value of the selected virtual control in the target splicing shape;

obtaining control information according to the configuration parameters and the sorting value; and sending the control information to the controller, wherein the control information is used to instruct the controller to perform lighting control on a target light-emitting module, and the target light-emitting module is a light-emitting module corresponding to the sorting value in the physical shape.

2. The control method according to claim 1, wherein:

the obtaining control information according to the configuration parameters and the sorting value further includes:

packaging the configuration parameters and the sorting value to generate the control information; and the sending the control information to the controller, wherein the control information is used to instruct the controller to perform lighting control on a target light-emitting module further includes:

sending the control information to the controller, wherein the control information is used to instruct the controller to generate a control instruction according to the configuration parameters and the sorting value, and to send the control instruction to the target light-emitting module so as to perform lighting control on the target light-emitting module; and the control instruction is parsed and executed by the target light-emitting module.

3. The control method according to claim 1, wherein:

the obtaining control information according to the configuration parameters and the sorting value further includes:

determining the control information according to the configuration parameters and the sorting value, the control information including the configuration parameters of the target light-emitting module corresponding to the sorting value; and generating a control instruction according to the control information; and the sending the control information to the controller, wherein the control information is used to instruct the controller to perform lighting control on a target light-emitting module further includes:

sending the control instruction to the controller, the control instruction being used to instruct the controller to forward the control instruction to the target light-emitting module to perform lighting control on the target light-emitting module, wherein the control instruction is parsed and executed by the target light-emitting module.

4. The control method according to claim 1, wherein:

a shape of the virtual control is consistent with a shape of the light-emitting module, the light-emitting module is a polygonal structure and includes an edge-emitting unit on at least one edge of the polygonal structure;

the in response to a configuring operation on a selected virtual control in the target splicing shape, recording configuration parameters of the selected virtual control further includes:

in response to the configuring operation on a selected edge of the virtual control in the target splicing shape, recording the configuration parameters of the selected edge;

the determining a sorting value of the selected virtual control in the target splicing shape further includes:

determining an edge sorting value of the selected edge in the target splicing shape; and the obtaining control information according to the configuration parameters and the sorting value further includes:

obtaining the control information according to the configuration parameters of the selected edge and the edge sorting value, the control information being also used to instruct the controller to perform lighting control on a target edge light-emitting unit, and the target edge light-emitting unit being an edge light-emitting unit in the physical shape corresponding to the edge sorting value.

5. The control method according to claim 1, wherein the determining a sorting value of the selected virtual control in the target splicing shape further includes:

determining a splicing order value of the virtual control in the target splicing shape; and using the splicing order value as the sorting value of the selected virtual control in the target splicing shape.

6. The control method according to claim 3, wherein, the control instruction includes a plurality of control fields, and the plurality of control fields one-to-one correspond to the plurality of the light-emitting modules in the physical shape, each of the control fields includes control parameters for the light-emitting module to parse, and the control parameters are determined based on the configuration parameters and the sorting value of the selected virtual control; and the generating the control instruction further includes:

according to N number of virtual controls in the target splicing shape, determining a number of the control fields to be N, wherein the N control fields are arranged in sequence; and based on the configuration parameters and the sorting value, configuring control parameters for each control field to generate the control instruction, wherein the sorting order of the control field configured with the control parameters is the same as the sorting value.

7. The control method according to claim 1, wherein the obtaining and displaying a target splicing shape on the control interface further includes:

in response to a splicing configuring operation, splicing virtual controls corresponding to the plurality of light-emitting modules into the target splicing shape on the control interface.

8. The control method according to claim 7, wherein the in response to a splicing configuring operation, splicing virtual controls corresponding to the plurality of light-emitting modules into the target splicing shape on the control interface further includes:
- Step A, in response to the splicing configuring operation, determining an initial virtual control on the control interface;
- Step B, based on a shape of the initial virtual control, generating two or more additional controls around the initial virtual control, and the additional controls are used to indicate a display position of a next virtual control;
- Step C, in response to an adding operation, determining a target adding position among the two or more additional controls, and displaying the next virtual control at the target adding position;
- Step D, based on a shape of the next virtual control, generating two or more additional controls around the next virtual control, and the additional controls are used to indicate an adding position of the next virtual control; and
- in response to adding operations, performing Step A to Step D until a target confirmation instruction is received, and the target splicing shape is obtained, wherein the target confirmation instruction indicates that the user has completed adding virtual controls.

9. A light-emitting device control method applicable to a light-emitting device, wherein the light-emitting device includes a controller and a plurality of light-emitting modules, the light-emitting device is communicatively connected to a terminal device; the plurality of the light-emitting modules are spliced according to a target splicing shape, the target slicing shape is determined by a splicing shape of virtual controls displayed on the control interface of the terminal device; the control method comprising:
- receiving, by the controller, control information sent by the terminal device, wherein the control information is generated by the terminal device based on a received configuring operation on a selected virtual control, and the control information includes configuration parameters of the selected virtual control and a sorting value of the selected virtual control in the target splicing shape; and
- performing, by the controller, lighting control on a target light-emitting module according to the control information, the target light-emitting module being a light-emitting module corresponding to the sorting value in the physical shape.

10. The control method according to claim 9, wherein the performing, by the controller, lighting control on a target light-emitting module according to the control information further includes:
- generating, by the controller, a control instruction based on the configuration parameters and the sorting value according to the control information;
- sending, by the controller, the control instruction to the target light-emitting module; and
- parsing and executing, by the target light-emitting module, the control instruction.

11. The control method according to claim 9, wherein:
- the control information is a control instruction generated by the terminal device and directly parsed and executed by the light-emitting module; and
- the performing, by the controller, lighting control on a target light-emitting module according to the control information further includes:
  - sending, by the controller, the control instruction to the target light-emitting module; and
  - parsing and executing, by the target light-emitting module, the control instruction.

12. The control method according to claim 10, wherein:
- the control instruction includes a plurality of control fields, and the plurality of control fields one-to-one correspond to the plurality of the light-emitting modules spliced according to the target splicing shape, each of the control fields includes control parameters for the light-emitting module to parse, and the control parameters are determined based on the configuration parameters and the sorting value of the selected virtual control; and
- the generating the control instruction further includes:
  - according to N number of virtual controls in the target splicing shape, determining a number of the control fields to be N, wherein the N control fields are arranged in sequence; and
  - based on the configuration parameters and the sorting value, configuring control parameters for each control field to generate the control instruction, wherein the sorting order of the control field configured with the control parameters is the same as the sorting value.

13. The control method according to claim 10, wherein:
- the plurality of the light-emitting modules are sequentially spliced into a physical shape that is the same as the target splicing shape;
- the sending, by the controller, the control instruction to the target light-emitting module further includes:
  - sending, by the controller, the control instruction to a first light-emitting module, wherein the first light-emitting module is a first light-emitting module among the plurality of light-emitting modules arranged in sequence;
  - intercepting, by the first light-emitting module, a first control field from the N control fields of the received control instruction, and sending intercepted remaining (N−1) control fields to a second light-emitting module, wherein the second light-emitting module is a next light-emitting module adjacent to the first light-emitting module among the plurality of light-emitting modules arranged in sequence;
  - intercepting, by the second light-emitting module, a first control field from the (N−1) control fields of the received control instruction, and sending the intercepted remaining (N−2) control fields to a third light-emitting module adjacent to the second light-emitting module;
  - sequentially by the i-th light-emitting module, i being an integer number from 3 to N−2, intercepting a first control field from the (N−(i−1) control fields of the received control instruction, and sending the intercepted remaining (N−i) control fields to a third light-emitting module adjacent to the second light-emitting module;
  - intercepting, by the (N−1)-th light-emitting module, a first control field from two control fields of the received control instruction, and sending intercepted remaining control field to the N-th light-emitting module; and
  - receiving, by the N-th light-emitting module, the control field sent by the (N−1)-th light-emitting module; and the parsing and executing, by the target light-emitting module, the control instruction further includes:
parsing and executing, by the light-emitting module received the control instruction, the control parameters in the intercepted control field control instruction.

14. The control method according to claim 13, wherein the parsing and executing, by the light-emitting module received the control instruction, the control parameters in the intercepted control field control instruction further includes:
parsing, by the light-emitting module received the control instruction, the intercepted control field and obtaining corresponding control parameters;
in response to a low-voltage-level input signal lasting for a predetermined period of time, executing, by the light-emitting module, the control parameters.

15. An electronic device, comprising:
a memory for storing computer-readable instructions; and
at least one processor coupled to the memory and, when executing the computer-readable instructions, configured to perform:
obtaining and displaying a target splicing shape on a control interface, wherein the target splicing shape includes multiple visual virtual controls, and the target splicing shape is used to instruct a user to splice a controller and a plurality of light-emitting modules into a physical shape consistent with the target splicing shape;
in response to a configuring operation on a selected virtual control in the target splicing shape, recording configuration parameters of the selected virtual control;
determining a sorting value of the selected virtual control in the target splicing shape;
obtaining control information according to the configuration parameters and the sorting value; and
sending the control information to the controller, wherein the control information is used to instruct the controller to perform lighting control on a target light-emitting module, and the target light-emitting module is a light-emitting module corresponding to the sorting value in the physical shape.

16. The electronic device according to claim 15, wherein:
the obtaining control information according to the configuration parameters and the sorting value further includes:
packaging the configuration parameters and the sorting value to generate the control information; and
the sending the control information to the controller, wherein the control information is used to instruct the controller to perform lighting control on a target light-emitting module further includes:
sending the control information to the controller, wherein the control information is used to instruct the controller to generate a control instruction according to the configuration parameters and the sorting value, and to send the control instruction to the target light-emitting module so as to perform lighting control on the target light-emitting module; and the control instruction is parsed and executed by the target light-emitting module.

17. The electronic device according to claim 15, wherein:
the obtaining control information according to the configuration parameters and the sorting value further includes:
determining the control information according to the configuration parameters and the sorting value, the control information including the configuration parameters of the target light-emitting module corresponding to the sorting value; and
generating a control instruction according to the control information; and
the sending the control information to the controller, wherein the control information is used to instruct the controller to perform lighting control on a target light-emitting module further includes:
sending the control instruction to the controller, the control instruction being used to instruct the controller to forward the control instruction to the target light-emitting module to perform lighting control on the target light-emitting module, wherein the control instruction is parsed and executed by the target light-emitting module.

18. The electronic device according to claim 15, wherein:
a shape of the virtual control is consistent with a shape of the light-emitting module, the light-emitting module is a polygonal structure and includes an edge-emitting unit on at least one edge of the polygonal structure;
the in response to a configuring operation on a selected virtual control in the target splicing shape, recording configuration parameters of the selected virtual control further includes:
in response to the configuring operation on a selected edge of the virtual control in the target splicing shape, recording the configuration parameters of the selected edge;
the determining a sorting value of the selected virtual control in the target splicing shape further includes:
determining an edge sorting value of the selected edge in the target splicing shape; and
the obtaining control information according to the configuration parameters and the sorting value further includes:
obtaining the control information according to the configuration parameters of the selected edge and the edge sorting value, the control information being also used to instruct the controller to perform lighting control on a target edge light-emitting unit, and the target edge light-emitting unit being an edge light-emitting unit in the physical shape corresponding to the edge sorting value.

* * * * *